(12) United States Patent
Okayama et al.

(10) Patent No.: US 11,137,599 B2
(45) Date of Patent: Oct. 5, 2021

(54) DISPLAY DEVICE AND MOVING BODY CARRYING DISPLAY DEVICE

(71) Applicant: Panasonic Intellectual Property Management Co., Ltd., Osaka (JP)

(72) Inventors: Hiroaki Okayama, Nara (JP); Satoshi Kuzuhara, Osaka (JP); Masahito Ogata, Osaka (JP); Toshiya Mori, Osaka (JP); Ken'ichi Kasazumi, Osaka (JP); Masafumi Sueyoshi, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 234 days.

(21) Appl. No.: 16/437,981

(22) Filed: Jun. 11, 2019

(65) Prior Publication Data
US 2019/0293936 A1    Sep. 26, 2019

Related U.S. Application Data

(63) Continuation of application No. PCT/JP2017/044303, filed on Dec. 11, 2017.

(30) Foreign Application Priority Data

Dec. 27, 2016 (JP) .............................. JP2016-254533

(51) Int. Cl.
*G03B 21/56* (2006.01)
*G02B 27/01* (2006.01)
(Continued)

(52) U.S. Cl.
CPC .......... *G02B 27/0149* (2013.01); *B60R 11/02* (2013.01); *G02B 27/01* (2013.01);
(Continued)

(58) Field of Classification Search
CPC ........ G03B 21/28; G03B 21/56; G03B 21/62; G03B 21/208; G03B 21/625;
(Continued)

(56) References Cited

U.S. PATENT DOCUMENTS 10,488,655 B2    11/2019 Kasazumi et al.
2009/0160736 A1    6/2009 Shikita
(Continued)

FOREIGN PATENT DOCUMENTS

EP    3299866 A1    3/2018
JP    2009-150947    7/2009

OTHER PUBLICATIONS

International Search Report of PCT application No. PCT/JP2017/044303 dated Feb. 20, 2018.
(Continued)

*Primary Examiner* — Sultan Chowdhury
(74) *Attorney, Agent, or Firm* — Greenblum & Bernstein, P.L.C.

(57) ABSTRACT

In a display device, an irradiation unit includes an imaging optical system. The imaging optical system scans and irradiates a front surface of a screen with light to form an image. The light passing through the screen and output from the screen in a movement direction is incident on a projection unit as incident light. The projection unit irradiates a reflective member with the incident light to allow the reflective member to reflect the incident light to form a virtual image corresponding to the image in a target space. A locus of a focal position of the imaging optical system when the irradiation unit wholly scans the front surface of the screen is within a range between the front surface of the screen at a first position and the front surface of the screen at a second position.

10 Claims, 17 Drawing Sheets

(51) Int. Cl.
*H04N 5/74* (2006.01)
*H04N 13/30* (2018.01)
*H04N 5/64* (2006.01)
*B60R 11/02* (2006.01)
*G02B 30/00* (2020.01)
*G03B 21/28* (2006.01)
*B60K 35/00* (2006.01)
*G02B 26/10* (2006.01)

(52) U.S. Cl.
CPC ..... *G02B 27/0101* (2013.01); *G02B 27/0179* (2013.01); *G02B 30/00* (2020.01); *G03B 21/28* (2013.01); *G03B 21/56* (2013.01); *H04N 5/64* (2013.01); *H04N 5/74* (2013.01); *H04N 13/30* (2018.05); *B60K 35/00* (2013.01); *B60K 2370/1529* (2019.05); *B60K 2370/166* (2019.05); *B60K 2370/31* (2019.05); *B60K 2370/52* (2019.05); *G02B 26/101* (2013.01); *G02B 2027/0147* (2013.01); *G02B 2027/0154* (2013.01); *G02B 2027/0185* (2013.01)

(58) Field of Classification Search
CPC ............ G03B 21/2013; G03B 21/2033; G03B 21/2066; G02B 27/01; G02B 27/0101; G02B 27/0149; G02B 27/0172; G02B 27/0176; G02B 27/0179; B60K 2370/29; B60K 2370/52; B60K 2370/334; B60K 2370/347; B60K 2370/1529; H04N 9/3105; H04N 9/3129; H04N 9/3152; H04N 9/3161; H04N 9/3164; H04N 9/3173

See application file for complete search history.

(56) References Cited

U.S. PATENT DOCUMENTS

| | | | |
|---|---|---|---|
| 2011/0170023 A1* | 7/2011 | Ishida | B60K 35/00 348/837 |
| 2017/0115485 A1* | 4/2017 | Saito | B60K 35/00 |
| 2018/0136463 A1* | 5/2018 | Nambara | G02B 3/08 |
| 2020/0353816 A1* | 11/2020 | Hirata | H04N 9/3147 |

OTHER PUBLICATIONS

German Office Action dated Apr. 7, 2021 for the related German Patent Application No. 112017006586.0, together with an English-language translation.

* cited by examiner

DISPLAY DEVICE AND MOVING BODY CARRYING DISPLAY DEVICE

CROSS-REFERENCE TO RELATED APPLICATIONS

This application is a continuation of the PCT International Application No. PCT/JP2017/044303 filed on Dec. 11, 2017, which claims the benefit of foreign priority of Japanese patent application No. 2016-254533 filed on Dec. 27, 2016, the contents all of which are incorporated herein by reference."

TECHNICAL FIELD

The present disclosure generally relates to display devices and moving bodies respectively carrying the display devices, and particularly relates to a display device configured to allow light passing through a screen to form a virtual image in a target space, and a moving body carrying the display device.

BACKGROUND ART

Conventionally, as a vehicular display device, there has been a known vehicular head-up display device that remotely displays driving information image necessary for driving and other images as a virtual image through a windshield.

For example, a display device described in PTL 1 includes a scanning unit for two-dimensionally scanning with light and a screen on which an image is drawn with scanning light from the scanning unit. The image formed on the screen is reflected by a windshield of a vehicle through a projection unit and reaches driver's eyes. Therefore, a driver visually recognizes a virtual image far ahead of the windshield with his or her eyes. According to the display device described in PTL 1, the screen is moved in a direction orthogonal to a surface of the screen. This can change a distance from the driver's eyes to the virtual image.

CITATION LIST

Patent Literature

PTL 1: Unexamined Japanese Patent Publication No. 2009-150947

SUMMARY OF THE INVENTION

However, in the display device described in PTL 1, an adjusting width of a distance from eyes of a person (driver) to a virtual image is determined according to a moving distance of a screen. This requires a wider moving range of the screen to obtain a wider adjusting width of the distance from the eyes of the person to the virtual image. When the moving range of the screen is extended, however, imaging capability on the screen may lower, as well as resolution of a virtual image may lower.

The present disclosure provides a display device capable of suppressing resolution of a virtual image from lowering, and a moving body carrying the display device.

A display device according to an aspect of the present disclosure includes a screen, a drive unit, an irradiation unit, and a projection unit. The screen has a display plane inclined with respect to a reference plane. The drive unit is configured to move the screen between a first position and a second position in a movement direction orthogonal to the reference plane. The irradiation unit includes an imaging optical system, and is configured to cause the imaging optical system to irradiate the screen with light to scan the display plane of the screen to form an image on the display plane. The light passing through the screen and output from the screen in the movement direction described above is incident on a projection unit as incident light. The projection unit projects the incident light to a reflective member to allow the reflective member to reflect the incident light to form a virtual image corresponding to the image described above in a target space. A locus of a focal position of the imaging optical system when the irradiation unit wholly scans the display plane is within a range between the display plane of the screen at the first position and the display plane of the screen at the second position.

A moving body according to an aspect of the present disclosure includes a main body, a drive unit, the display device described above, and a reflective member. The drive unit is configured to move the main body. The main body carries the display device and the reflective member. The reflective member is configured to reflect light from the projection unit of the display device.

According to the present disclosure, resolution of a virtual image can be suppressed from lowering.

DESCRIPTION OF EMBODIMENTS

First Exemplary Embodiment

Figure 1:
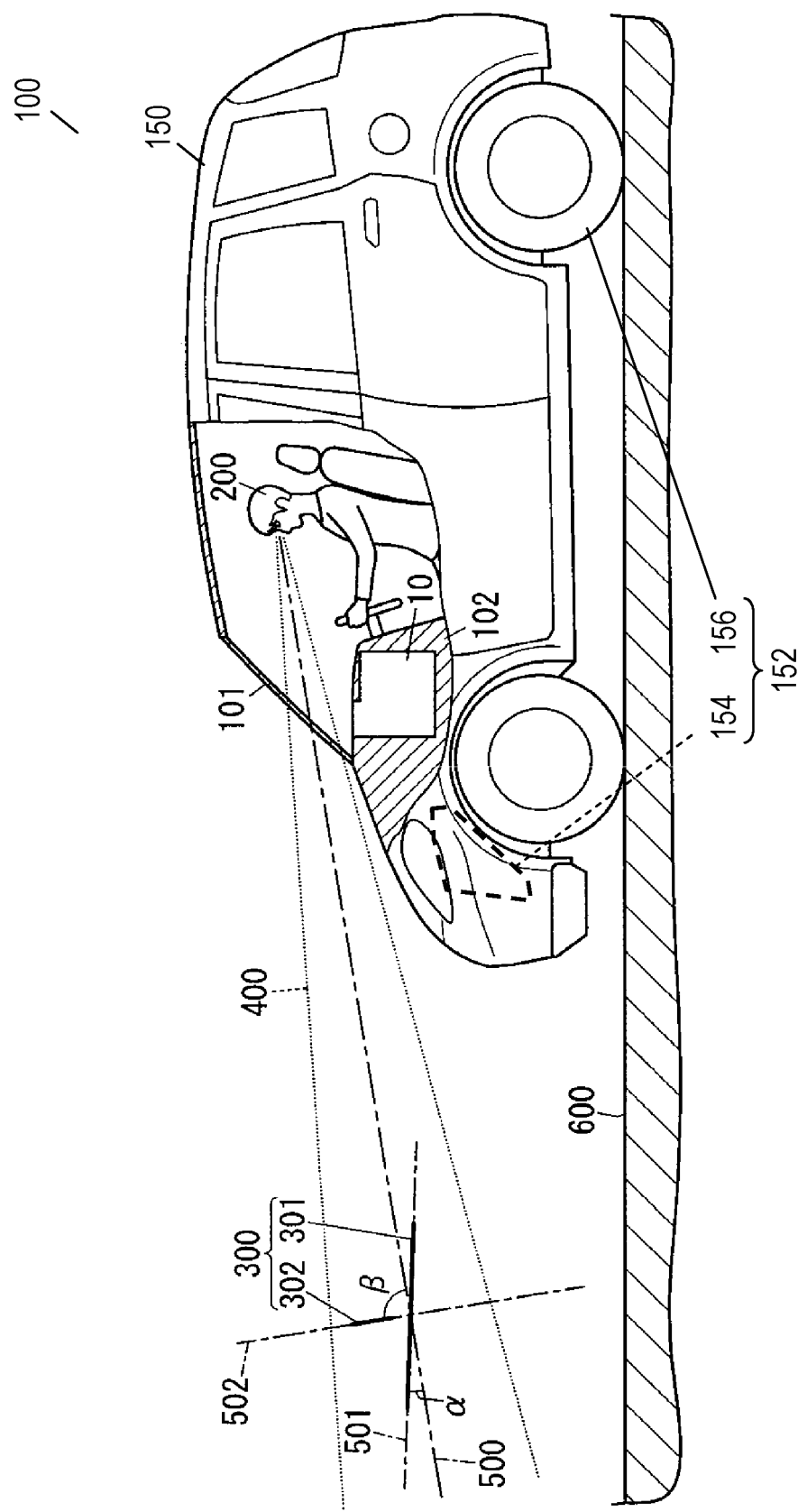
FIG. 1 is a conceptual diagram of a vehicle carrying a display device according to a first exemplary embodiment of the present disclosure.

FIG. 1 is a conceptual diagram of vehicle 100 carrying display device 10 according to a first exemplary embodiment of the present disclosure. Vehicle 100 includes main body 150, drive unit 152 configured to move main body 150, display device 10 mounted on main body 150, and windshield 101 held to main body 150 to serve as a reflective member. Drive unit 152 includes drive source 154, such as an engine or a motor, and drive wheels 156 configured to be driven by drive source 154. Instead of vehicle 100, display device 10 may be mounted on a moving body, such as a motorcycle provided with a windshield.

(1) Outline

As illustrated in FIG. 1, display device 10 according to the present exemplary embodiment is a head-up display (HUD) used for vehicle 100 serving as a moving body, for example.

Display device 10 is installed in a cabin of vehicle 100 to project an image on windshield 101 of vehicle 100 from below. In an example of FIG. 1, display device 10 is disposed in dashboard 102 below windshield 101. When the image is projected from display device 10 onto windshield 101, user 200 (driver) visually recognizes the image reflected by windshield 101 serving as a reflective member.

According to display device 10, user 200 (subject) visually recognizes virtual image 300 formed in target space 400 set ahead of vehicle 100 (outside of the vehicle) through windshield 101. Target space 400 is a space present ahead of windshield 101 (toward a direction deeper than windshield 101). The "virtual image" mentioned herein means an image formed by diverging light as if an object was actually present when the light emitted from display device 10 is diverged by a reflector such as windshield 101. Therefore, user 200 who drives vehicle 100 can view virtual image 300, which is formed by display device 10, while superimposing virtual image 300 on a real space spreading in front of vehicle 100. Hence, according to display device 10, various pieces of driving assistance information such as vehicle speed information, navigation information, pedestrian information, front vehicle information, lane departure information, and vehicle condition information can be displayed as virtual image 300, and can cause user 200 to visually recognize the various pieces of driving assistance information. Accordingly, user 200 can visually acquire the driving assistance information only by slightly moving his or her line of sight from the state of being directed to the front of windshield 101.

In display device 10 according to the present exemplary embodiment, virtual image 300 formed in target space 400 includes at least two types of virtual images, which are first virtual image 301 and second virtual image 302. The "first virtual image" mentioned herein is virtual image 300 (301) formed on first virtual plane 501. The "first virtual plane" is a virtual plane whose inclination angle α with respect to optical axis 500 of display device 10 is smaller than predetermined value γ ($\alpha<\gamma$). Moreover, the "second virtual image" mentioned herein is virtual image 300 (302) formed on second virtual plane 502. The "second virtual plane" is a virtual plane whose inclination angle β with respect to optical axis 500 of display device 10 is larger than predetermined value γ ($\beta>\gamma$). The "optical axis" mentioned herein is an optical axis of an optical system of projection unit 4 (see FIG. 3) to be described later, that is, an axis that passes through a center of target space 400 and goes along an optical path of virtual image 300. An example of predetermined value γ is 45 degrees, and an example of inclination angle β is 90 degrees.

In the present exemplary embodiment, optical axis 500 extends along road surface 600 in front of vehicle 100 in target space 400 in front of vehicle 100. First virtual image 301 is formed on first virtual plane 501 substantially parallel to road surface 600, and second virtual image 302 is formed on second virtual plane 502 substantially perpendicular to road surface 600. For example, when road surface 600 is a horizontal plane, first virtual image 301 is displayed along the horizontal plane, and second virtual image 302 is displayed along a vertical plane.

Figure 2:
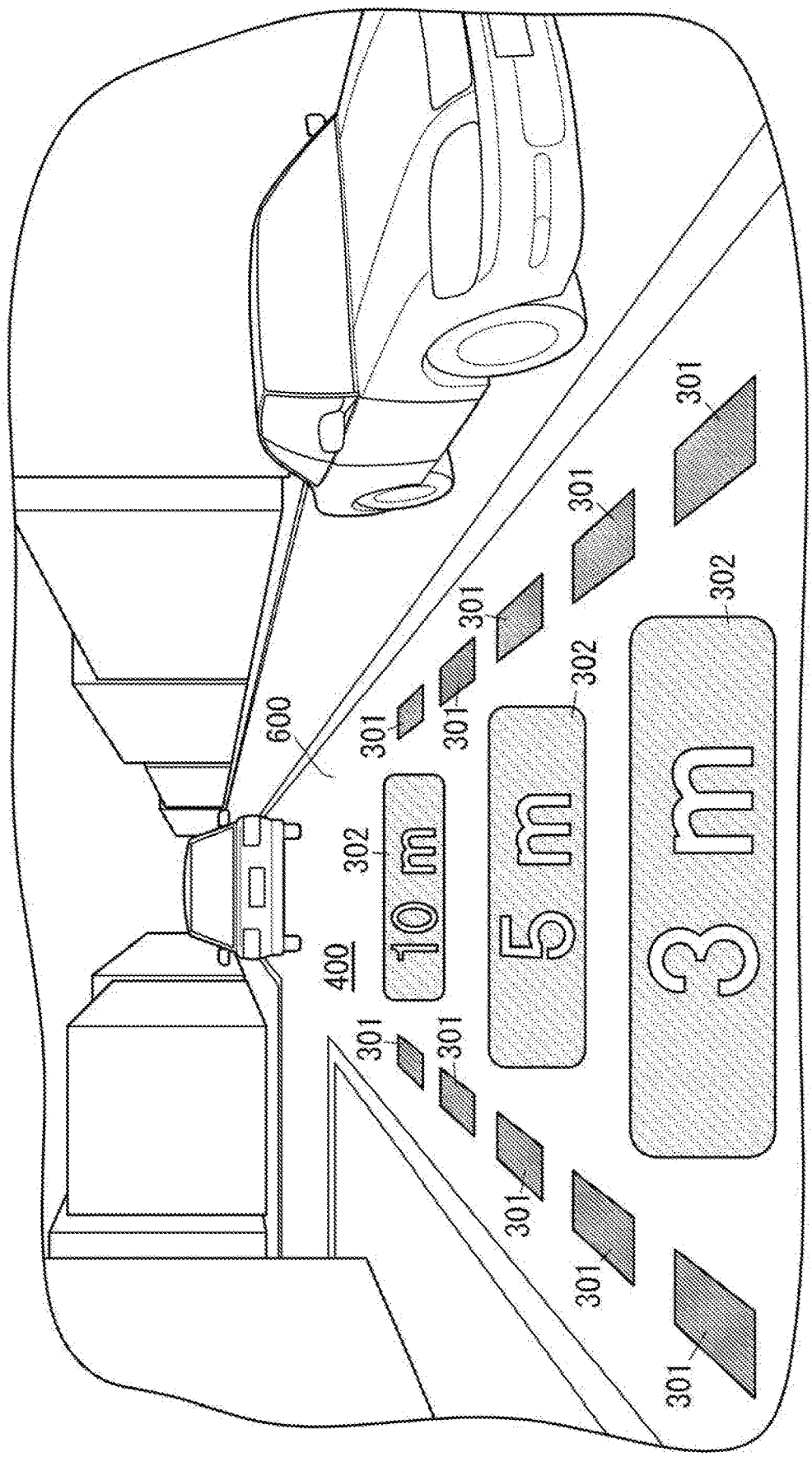
FIG. 2 is a conceptual diagram illustrating a visual field of a user when the display device according to the first exemplary embodiment of the present disclosure is used.

FIG. 2 is a conceptual diagram illustrating a visual field of user 200. In other words, as illustrated in FIG. 2, display device 10 according to the present exemplary embodiment is capable of displaying first virtual image 301 viewed with depth along road surface 600 and second virtual image 302 viewed upright on road surface 600 at a certain distance from user 200. Hence, for user 200, first virtual image 301 looks like being present on a plane substantially parallel to road surface 600, and second virtual image 302 looks like being present on a plane substantially perpendicular to road surface 600. An example of first virtual image 301 is navigation information indicating a traveling direction of vehicle 100, which can present an arrow that indicates a right turn or a left turn on road surface 600. An example of second virtual image 302 is information indicating a distance to a front vehicle or a pedestrian, which can present a distance to the front vehicle (inter-vehicle distance) on the front vehicle.

(2) Configuration

Figure 3:
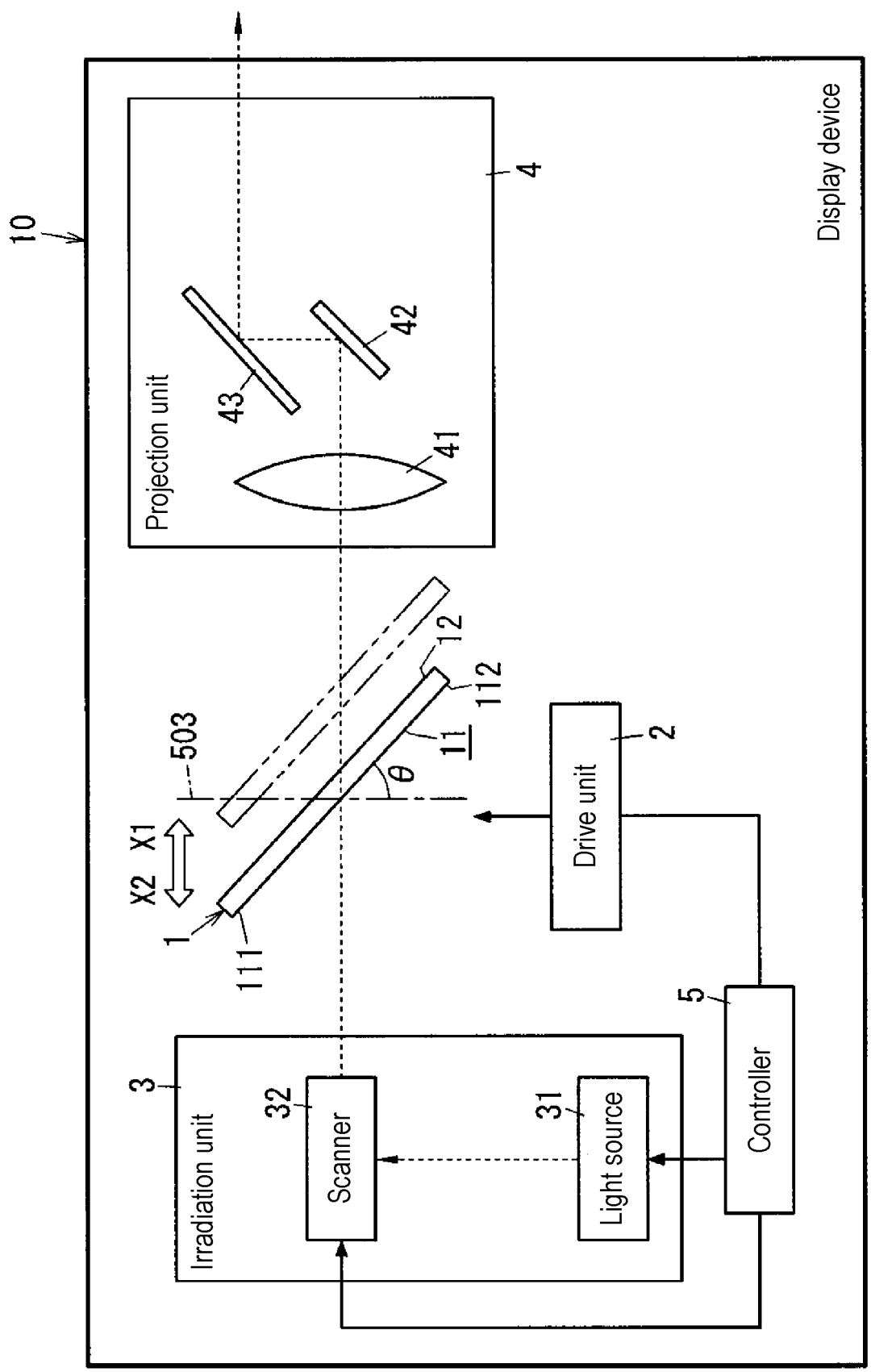
FIG. 3 is a conceptual diagram illustrating a configuration of the display device according to the first exemplary embodiment of the present disclosure.

As illustrated in FIG. 3, display device 10 according to the present exemplary embodiment includes screen 1, drive unit (driver) 2, irradiation unit (irradiator) 3, projection unit (projector) 4, and controller 5.

Screen 1 has translucency and forms an image to form virtual image 300 (see FIG. 1) in target space 400 (see FIG. 1). In other words, the image is drawn by the light from irradiation unit 3 on screen 1, and virtual image 300 is formed in target space 400 by the light transmitted through screen 1. Screen 1 is formed of a rectangular plate-shaped member with light-diffusing property, for example. Screen 1 has front surface 11 and rear surface 12 on both surfaces in a thickness direction. In the present exemplary embodiment, as an example, front surface 11 of screen 1 has the light-diffusing property with a large number of micro-lenses being formed on front surface 11 of screen 1. In the configuration, front surface 11 of screen 1 serves as a display plane used to form image 700 (see FIG. 7). Screen 1 is disposed between irradiation unit 3 and projection unit 4 with a posture directing front surface 11 toward irradiation unit 3, and front surface 11 is defined as an incident surface on which light from irradiation unit 3 is incident.

Front surface 11 of screen 1 is inclined at angle θ with respect to reference plane 503. Therefore, even when external light entered through projection unit 4 into a housing of display device 10 is reflected by front surface 11 of screen 1, windshield 101 would be less likely to be reflected with the reflected light (external light) through projection unit 4. That is, return light is suppressed from occurring. Furthermore, screen 1 is configured to be movable between first position Po1 (see FIG. 5A) and second position Po2 (see FIG. 5A) in movement direction X (directions indicated by arrows X1-X2 in FIG. 3) orthogonal to reference plane 503. The "reference plane" mentioned herein is not a real plane but a virtual plane that defines the movement direction of screen 1. Screen 1 is configured to be movable rectilinearly in movement direction X while maintaining a posture of front surface 11 inclined at angle θ with respect to reference plane 503.

Screen 1 further has first end part 111 and second end part 112 at both ends of front surface 11 in a direction inclined with respect to reference plane 503 (a direction parallel to front surface 11 on a paper plane of FIG. 3). A direction connecting first end part 111 and second end part 112 along front surface 11 of screen 1 is also referred to as a "longitudinal direction". First end part 111 is an end part closest to irradiation unit 3 on front surface 11, and second end part 112 is an end part farthest from irradiation unit 3 on front surface 11. In other words, in the longitudinal direction, a portion of screen 1 closer to first end part 111 is located closer to irradiation unit 3, and a portion of screen 1 closer to second end part 112 is located farther from irradiation unit 3.

Drive unit 2 moves screen 1 in movement direction X. Herein drive unit 2 can move screen 1 along movement direction X in both first direction X1 and second direction X2 opposite to each other. First direction X1 is a direction indicated by arrow "X1" (a right direction in FIG. 3), which is a direction in which screen 1 separates from irradiation unit 3, that is, a direction in which screen 1 approaches projection unit 4. Second direction X2 is a direction indicated by arrow "X2" (a left direction in FIG. 3), which is a direction in which screen 1 approaches irradiation unit 3, that is, a direction in which screen 1 separates from projection unit 4. A terminal position of the moving range of screen 1 when drive unit 2 has moved screen 1 in first direction X1 is first position Po1 (see FIG. 5A). A terminal position of the moving range of screen 1 when drive unit 2 has moved screen 1 in second direction X2 is second position Po2 (see FIG. 5A). That is, drive unit 2 can move screen 1 between first position Po1 and second position Po2 in a bidirectional manner in both of first direction X1 and second direction X2. For example, drive unit 2 is an electric-driven actuator such as a voice coil motor, and operates according to a first control signal from controller 5.

Irradiation unit 3 is a scanning-type light irradiation unit, and irradiates screen 1 with light. In other words, irradiation unit 3 irradiates screen 1 with light used for scanning front surface 11 of screen 1 so as to change an irradiation position of light on front surface 11 of screen 1. Specifically, irradiation unit 3 includes light source 31 and scanner 32. In irradiation unit 3, each of light source 31 and scanner 32 operates according to a second control signal from controller 5.

Light source 31 is a laser module that outputs laser light. Light source 31 includes a red laser diode that outputs a laser light beam of red color (R), a green laser diode that outputs a laser light beam of green color (G), and a blue laser diode that outputs a laser light beam of blue color (B). Three color laser light beams output from these three kinds of laser diodes are synthesized by, for example, a dichroic mirror, and incident on scanner 32.

Scanner 32 performs scanning with the light from light source 31 to irradiate screen 1 with light used for scanning front surface 11 of screen 1. Herein, scanner 32 performs raster-scanning in which light is two-dimensionally scanned in the longitudinal direction and a lateral direction of front surface 11 of screen 1. The "lateral direction" mentioned herein is a direction parallel to both front surface 11 of screen 1 and reference plane 503, and is a direction orthogonal to the "longitudinal direction" on front surface 11 (a direction orthogonal to the paper plane of FIG. 3).

Figure 4A:
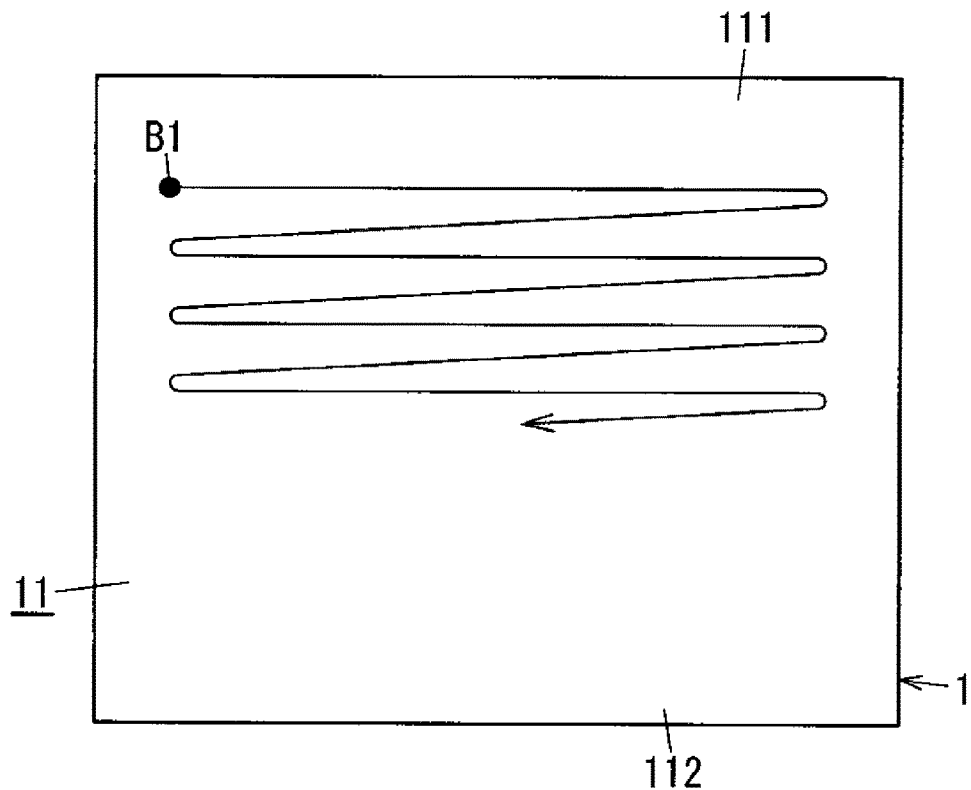
FIG. 4A is a conceptual diagram illustrating movement of a luminescent spot on a front surface of a screen in an outward path in the display device illustrated in FIG. 3.
Figure 4B:
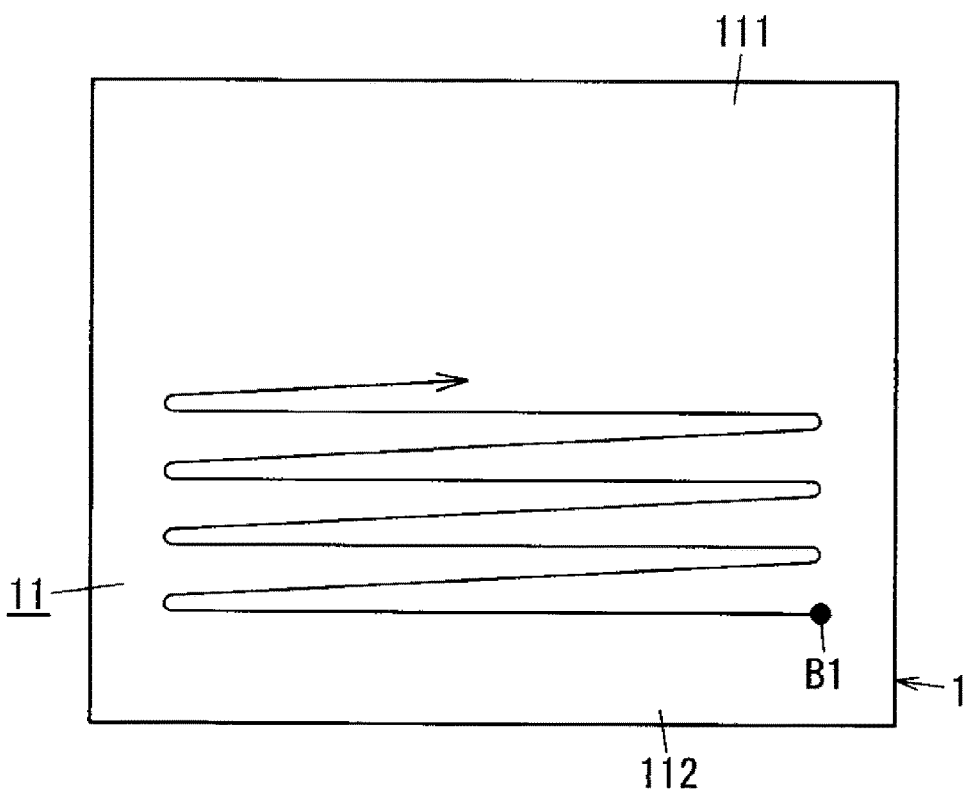
FIG. 4B is a conceptual diagram illustrating movement of a luminescent spot on the front surface of the screen in a return path in the display device illustrated in FIG. 3.

In scanner 32, as illustrated in FIGS. 4A and 4B, luminescent spot B1 formed on front surface 11 of screen 1 is one-dimensionally scanned along the lateral direction to form a scan line, and luminescent spot B1 is scanned along the longitudinal direction to form a two-dimensional image. Scanner 32 performs scanning with luminescent spot B1 such that luminescent spot B1 reciprocates between the both ends (first end part 111 and second end part 112) of front surface 11 in the longitudinal direction while repeating the above-described operations. FIG. 4A is a diagram conceptually illustrating movement of luminescent spot B1 on front surface 11 of screen 1, in an "outward path" that scans from first end part 111 toward second end part 112. FIG. 4B is a diagram conceptually illustrating movement of luminescent spot B1 on front surface 11 of screen 1, in a "return path" that scans from second end part 112 toward first end part 111.

In other words, in the present exemplary embodiment, an operation state of irradiation unit 3 includes a first scanning state serving as the "outward path" and a second canning state serving as the "return path". The first scanning state is an operation state in which front surface 11 of screen 1 is scanned from first end part 111 toward second end part 112. The second scanning state is an operation state in which front surface 11 of screen 1 is scanned from second end part 112 toward first end part 111.

Figure 5A:
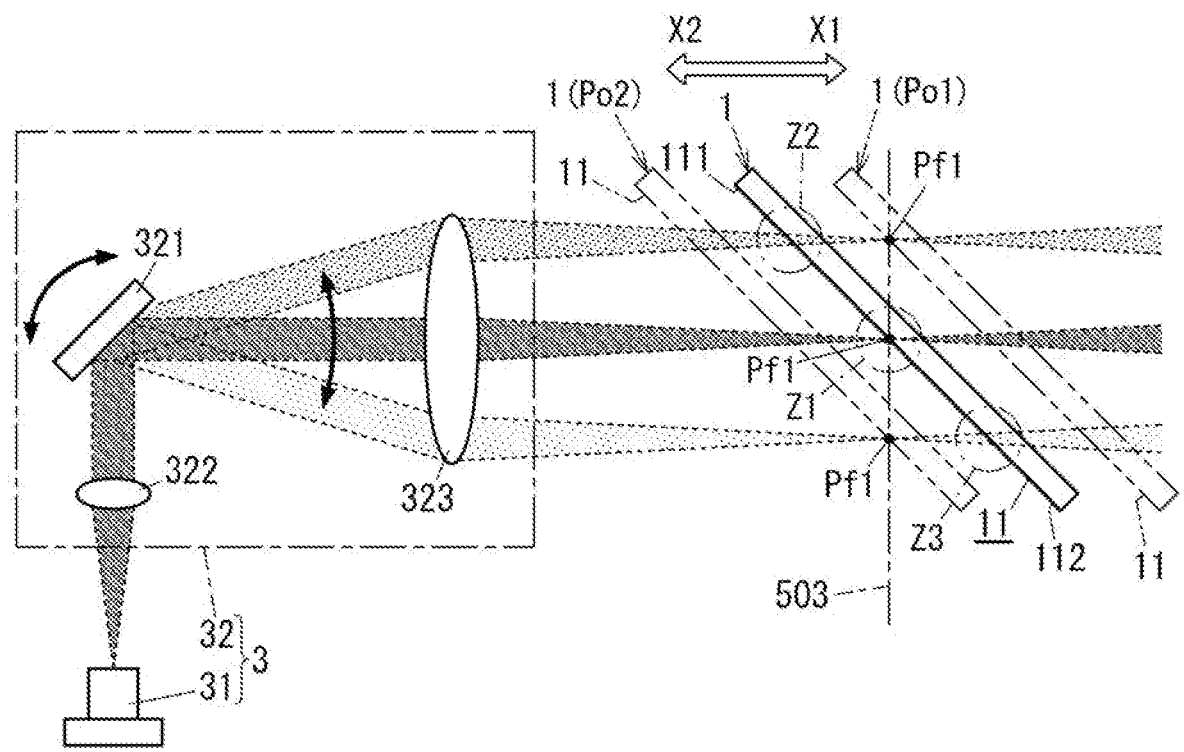
FIG. 5A is a conceptual diagram illustrating a configuration of an irradiation unit in the display device illustrated in FIG. 3.

Scanner 32 includes a small scanning mirror using a micro electro mechanical systems (MEMS) technology, for example. As illustrated in FIG. 5A, scanner 32 includes mirror unit 321 that reflects the laser light, and rotates mirror unit 321 to reflect the light from light source 31 in a direction according to a rotation angle (deflection angle) of mirror unit 321. This allows scanner 32 to scan screen 1 with the light from light source 31. Scanner 32 rotates mirror unit 321 around two axes orthogonal to each other to achieve the raster-scanning that performs two-dimensional scanning with light.

Scanner 32 further includes lens 322 and imaging optical system 323. Lens 322 is disposed between light source 31 and mirror unit 321, and causes parallel light to be incident on mirror 321. Imaging optical system 323 is formed from a telecentric lens, and is disposed between mirror unit 321 and screen 1. In other words, imaging optical system 323 is an optical system whose primary optical ray is made parallel to an optical axis over the entire lens. Light passing through imaging optical system 323 is output parallel to the optical axis (a straight line connecting imaging optical system 323 and screen 1). In the present exemplary embodiment, it is assumed that the optical axis of imaging optical system 323 is parallel to movement direction X. FIG. 5A is merely a schematic diagram for describing the configuration of irradiation unit 3 with some differences from display device 10 according to the present exemplary embodiment.

In here, imaging optical system 323 is an optical system configured to form (image) image 700 (see FIG. 7) on front surface 11 (display plane) of screen 1. That is, irradiation unit 3 causes imaging optical system 323 to irradiate screen 1 with light to scan front surface 11 (display plane) of screen 1 to form image 700 on the display plane, i.e., on front surface 11 of screen 1.

As exemplified in FIG. 5A, a locus of focal position Pf1 of imaging optical system 323 when irradiation unit 3 wholly scans front surface 11 (display plane) of screen 1 lies at a substantially constant position in movement direction X. That is, focal position Pf1 of imaging optical system 323 when irradiation unit 3 scans front surface 11 of screen 1 moves on reference plane 503 orthogonal to movement direction X. In other words, a locus of focal position Pf1 of imaging optical system 323 is formed on an image plane orthogonal to movement direction X. In short, the "image plane" is a plane including all focal positions Pf1 of imaging optical system 323 when irradiation unit 3 wholly scans front surface 11 (display plane) of screen 1, and is, in the present exemplary embodiment, orthogonal to movement direction X.

Figure 5B:
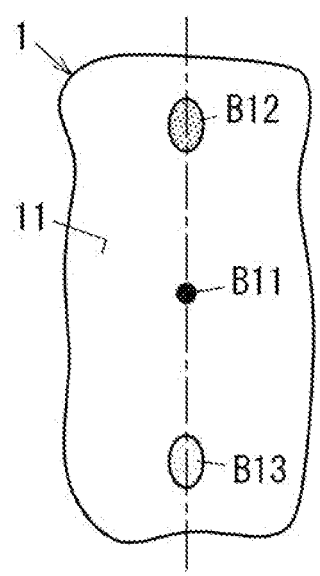
FIG. 5B is a conceptual diagram illustrating the front surface of the screen in the display device illustrated in FIG. 3.

On the other hand, since screen 1 is originally inclined with respect to reference plane 503, when screen 1 is located at the hold position, depending on a position on front surface 11 of screen 1 in the longitudinal direction, a difference in distance to focal position Pf1 of imaging optical system 323 in movement direction X occurs. Therefore, as illustrated in FIG. 5B, sizes of luminescent spots B11, B12, and B13 formed on front surface 11 of screen 1 may vary depending on a position irradiated with light. FIG. 5B schematically illustrates, in regions Z1, Z2, and Z3 in FIG. 5A, luminescent spots B11, B12, and B13 (i.e., regions irradiated with light) respectively formed when irradiated with light from irradiation unit 3. In FIG. 5B, luminescent spot B11 represents an image of a luminescent spot formed in region Z1, luminescent spot B11 represents an image of a luminescent spot formed in region Z2, and luminescent spot B13 represents an image of a luminescent spot formed in region Z3.

If luminescent spots B11, B12, and B13 expand, resolution of image 700 (see FIG. 7) formed on screen 1 by light from irradiation unit 3 lowers. In display device 10 according to the present exemplary embodiment, to suppress resolution of image 700 from lowering, a positional relationship between focal position Pf1 of imaging optical system 323 and the moving range of screen 1 is specified as described below.

That is, in the present exemplary embodiment, a locus of focal position Pf1 of imaging optical system 323 when irradiation unit 3 wholly scans the display plane is within a range between the display plane of screen 1 at first position Po1 and the display plane of screen 1 at second position Po2. FIG. 5A illustrates screen 1 at first position Po1 with an assumed line (two-dot chain line) added with reference symbol "1 (Po1)", whereas screen 1 at second position Po2 with an assumed line (two-dot chain line) added with reference symbol "1 (Po2)". In other words, to allow a locus of focal position Pf1 of imaging optical system 323 when irradiation unit 3 wholly scans the display plane to be within the moving range of screen 1, a positional relationship between focal position Pf1 of imaging optical system 323 and the moving range of screen 1 is specified. The positional relationship described above is achieved when first position Po1 and second position Po2 are set based on a position of an image plane to be formed with a locus of focal position Pf1 of imaging optical system 323, and inclination angle θ of screen 1 with respect to reference plane 503 (see FIG. 3), for example.

Therefore, in display device 10 according to the present exemplary embodiment, even when screen 1 is in a state inclined with respect to reference plane 503, variations in size of luminescent spots B11, B12, and B13 formed on front surface 11 of screen 1 can be kept lower as much as possible. As a result, in display device 10, resolution of image 700 formed on screen 1 by light from irradiation unit 3 can be suppressed from lowering.

Projection unit 4 receives light that is output from irradiation unit 3 and is transmitted through screen 1 as incident light, and irradiates windshield 101 (see FIG. 1) with the incident light to allow the incident light to be reflected, thereby forming virtual image 300 (see FIG. 1) in target space 400 (see FIG. 1). Herein, projection unit 4 is disposed so as to align with screen 1 in movement direction X, and projects virtual image 300 with the light that is transmitted through screen 1 and is output from screen 1 along movement direction X. Projection unit 4 includes magnifying lens 41, first mirror 42, and second mirror 43, as illustrated in FIG. 3.

Magnifying lens 41, first mirror 42, and second mirror 43 are arranged in this order on a route of light penetrating screen 1. Magnifying lens 41 is disposed on an opposite side (in first direction X1) of screen 1 from irradiation unit 3 in movement direction X so as to receive the light output from screen 1 along movement direction X. Magnifying lens 41 magnifies image 700 (see FIG. 7) formed on screen 1 with the light from irradiation unit 3 to output the magnified image to first mirror 42. First mirror 42 reflects the light from magnifying lens 41 toward second mirror 43. Second mirror 43 reflects the light from first mirror 42 toward windshield 101 (see FIG. 1). In other words, projection unit 4 magnifies, with magnifying lens 41, image 700 formed on screen 1 with the light from irradiation unit 3, and projects the magnified image onto windshield 101, thereby forming virtual image 300 in target space 400. An optical axis of magnifying lens 41 corresponds to optical axis 500 of projection unit 4.

Controller 5 controls drive unit 2 and irradiation unit 3. Controller 5 controls drive unit 2 with the first control signal and controls irradiation unit 3 with the second control signal. Although details will be described later, controller 5 is configured to synchronize an operation of drive unit 2 with an operation of irradiation unit 3. In the present exemplary embodiment, irradiation unit 3 includes light source 31 and scanner 32. Controller 5 controls both light source 31 and scanner 32 with the second control signal. Controller 5 is composed of a microcomputer mainly including, for example, a central processing unit (CPU) and a memory. In other words, controller 5 is implemented by a computer including the CPU and the memory. The CPU executes a program stored in the memory, allowing the computer to function as controller 5. Herein, the program is recorded in the memory of controller 5 in advance. However, the program may be provided via a telecommunication line such as the Internet or by being recorded in a recording medium such as a memory card.

(3) Operation (3.1) Basic Operation

Figure 6:
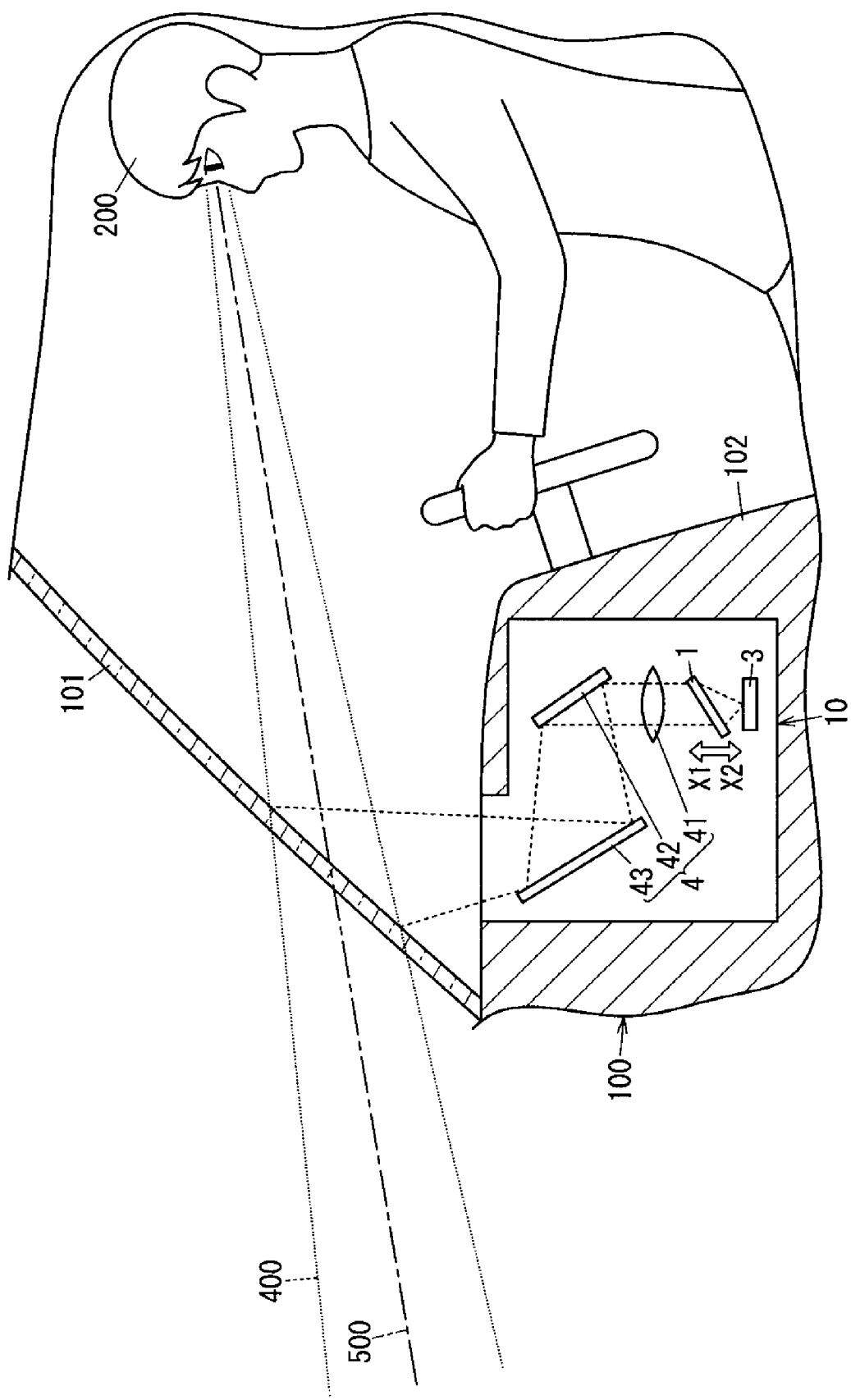
FIG. 6 is a conceptual diagram for describing an operation of the display device illustrated in FIG. 3.

A basic operation of display device 10 according to the present exemplary embodiment will now be described herein with reference to FIG. 6.

Controller 5 controls irradiation unit 3 to cause irradiation unit 3 to irradiate screen 1 with light. At this moment, irradiation unit 3 irradiates screen 1 with light used for scanning front surface 11 of screen 1. With this configuration, image 700 (see FIG. 7) is formed (projected) on front surface 11 or rear surface 12 of screen 1. In the present exemplary embodiment, as an example, front surface 11 of screen 1 has the light-diffusing property, thereby forming image 700 on front surface 11 of screen 1. Furthermore, the light from irradiation unit 3 is transmitted through screen 1, and projection unit 4 (magnifying lens 41, first mirror 42, and second mirror 43) irradiates windshield 101 with the light from irradiation unit 3. In this manner, image 700 formed on screen 1 is projected onto windshield 101 from below windshield 101 in the cabin of vehicle 100.

When image 700 is projected from projection unit 4 onto windshield 101, windshield 101 reflects the light from projection unit 4 toward user 200 (driver) in the cabin. This allows user 200 to visually recognize image 700 reflected by windshield 101. As a result, user 200 visually recognizes virtual image 300 formed in front of vehicle 100 (outside of the vehicle), through windshield 101.

In addition, controller 5 controls drive unit 2 to allow screen 1 to move in movement direction X. In a case where an irradiation position on front surface 11 of screen 1 on which the light is emitted from irradiation unit 3, that is, a position of luminescent spot B1 is constant, when screen 1 moves toward first direction X1, a distance from eyes (eye point) of user 200 to virtual image 300 (hereinafter, also referred to as a "viewing distance") becomes shorter (closer). In contrast, in the case where the position of luminescent spot B1 on front surface 11 of screen 1 is constant, when screen 1 moves toward second direction X2, the viewing distance to virtual image 300 becomes longer (farther). In short, the viewing distance to virtual image 300 changes according to a position of screen 1 in movement direction X. With screen 1 being closer to irradiation unit 3, the viewing distance to virtual image 300 projected corresponding to luminescent spot B1 on screen 1 becomes longer. In other words, with the irradiation position of the light from irradiation unit 3 on screen 1 becoming farther from projection unit 4 in movement direction X, the viewing distance to virtual image 300 projected by this light becomes longer.

(3.2) Specific Operation

Figure 7:
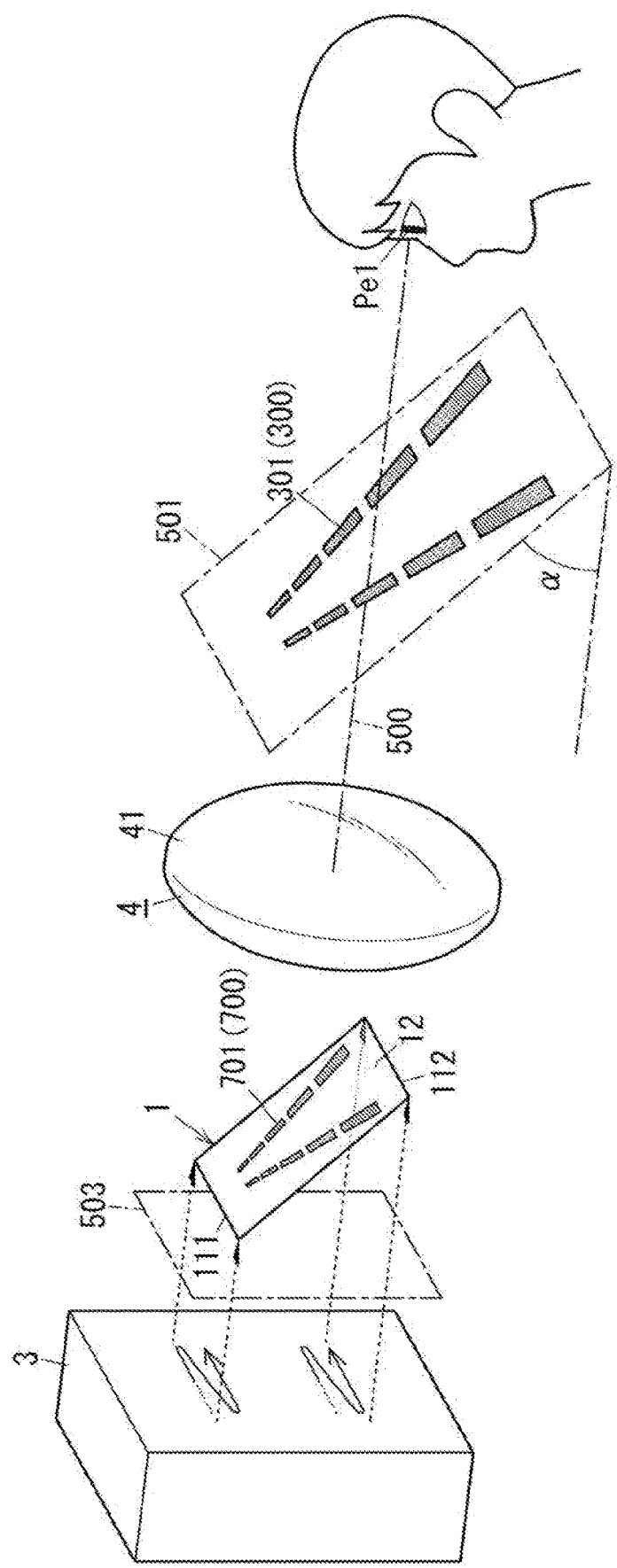
FIG. 7 is an explanatory diagram schematically illustrating an operation for projecting a first virtual image in the display device illustrated in FIG. 3.
Figure 8:
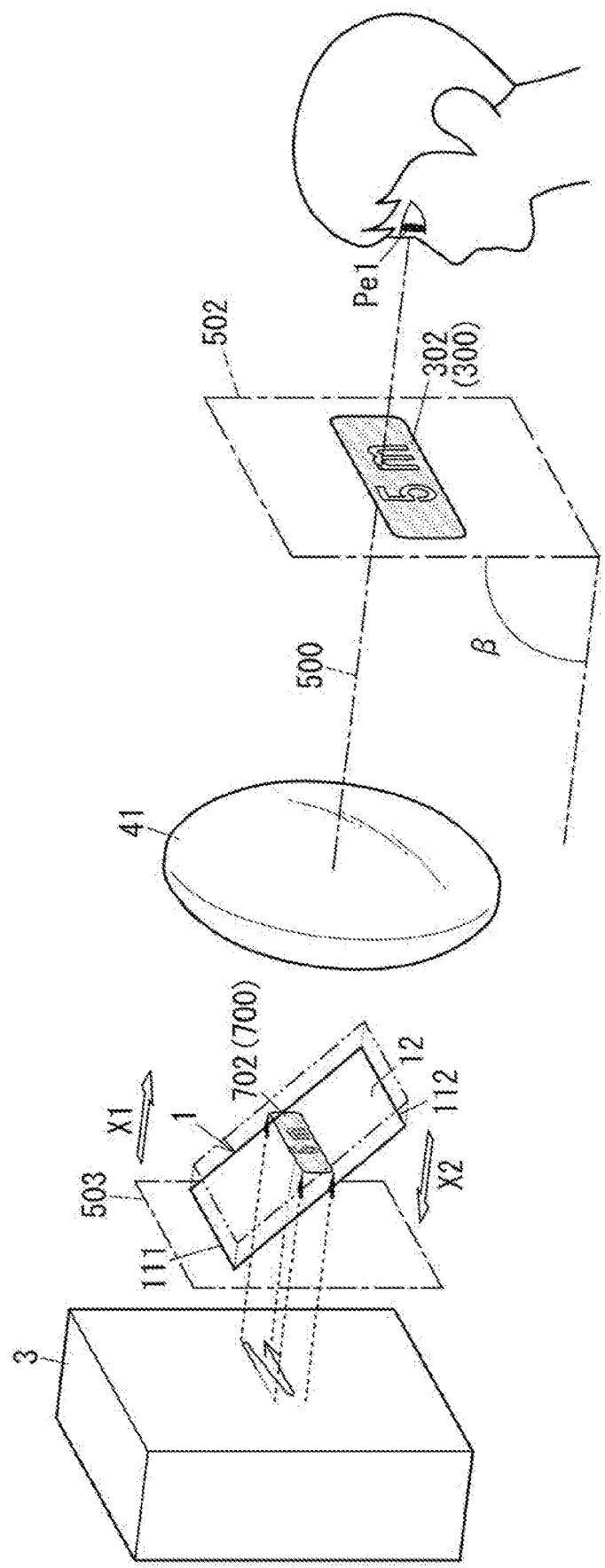
FIG. 8 is an explanatory diagram schematically illustrating an operation for projecting a second virtual image in the display device illustrated in FIG. 3.

A specific operation of display device 10 according to the present exemplary embodiment will now be described herein with reference to FIGS. 7 to 10B. FIG. 7 is a schematic diagram illustrating an operation of display device 10 for projecting first virtual image 301. FIG. 8 is a schematic diagram illustrating an operation of display device 10 for projecting second virtual image 302.

When first virtual image 301 is projected, as illustrated in FIG. 7, controller 5 holds screen 1 in movement direction X (a direction indicated by arrow X1 or X2 in FIG. 6), without moving screen 1 in movement direction X. In other words, controller 5 controls drive unit 2 and irradiation unit 3 such that irradiation unit 3 irradiates screen 1 located at a hold position with light. Since screen 1 is originally inclined with respect to movement direction X, even when screen 1 is located at the hold position, a difference in distance to projection unit 4 in movement direction X occurs depending on a position on front surface 11 of screen 1 in the longitudinal direction. Therefore, even when screen 1 is held, when the irradiation position of the light from irradiation unit 3 on front surface 11 of screen 1 changes in the longitudinal direction, the irradiation position of the light from irradiation unit 3 on front surface 11 of screen 1 changes in movement direction X. Accordingly, first image 701 is formed (projected) on screen 1. The "first image" mentioned herein is image 700 formed on front surface 11 or rear surface 12 of screen 1, which is formed along front surface 11 of screen 1, that is, is inclined with respect to reference plane 503. When first image 701 is projected onto windshield 101 from projection unit 4, user 200 visually recognizes first virtual image 301 formed in front of vehicle 100 through windshield 101.

For example, when the irradiation position of the light from irradiation unit 3 on front surface 11 of screen 1 becomes closer to first end part 111 in the longitudinal direction, the distance from projection unit 4 to the irradiation position in movement direction X becomes longer, whereby the viewing distance to virtual image 300 projected by this light becomes longer. In contrast, when the irradiation position of the light from irradiation unit 3 on front surface 11 of screen 1 becomes closer to second end part 112 in the longitudinal direction, the distance from projection unit 4 to the irradiation position in movement direction X becomes shorter, whereby the viewing distance to virtual image 300 projected by this light becomes shorter. With this configuration, first virtual image 301 serving as virtual image 300 is formed on first virtual plane 501 inclined at inclination angle α with respect to optical axis 500.

Accordingly, when irradiation unit 3 scans held screen 1 with light from first end part 111 toward second end part 112, for example, first virtual image 301 that is visually recognized by user 200 with depth along road surface 600 is projected. As illustrated in FIG. 7, the viewing distance from eye point Pe1 to first virtual image 301 formed at this time becomes larger on a side closer to first end part 111 (a side closer to an upper end part) in screen 1 than on a side closer to second end part 112 (a side closer to a lower end part) in screen 1. In other words, screen 1 is configured such that, when first end part 111 is irradiated with the light of irradiation unit 3, an optical path length from a drawing point on first virtual image 301 to projection unit 4 is maximized. Screen 1 is configured such that, when second end part 112 is irradiated with the light of irradiation unit 3, the optical path length from the drawing point on first virtual image 301 to projection unit 4 is minimized. In other words, first virtual image 301 is designed to be a virtual image inclined with respect to optical axis 500 such that the viewing distance is maximized on the upper end side in a vertical direction (a vertical direction in FIG. 2) when viewed from user 200.

On the other hand, when second virtual image 302 is projected, as illustrated in FIG. 8, controller 5 moves screen 1 in movement direction X (a direction indicated by arrow X1 or X2). In other words, controller 5 controls drive unit 2 and irradiation unit 3 such that irradiation unit 3 irradiates moving screen 1 with light. Since screen 1 is originally inclined with respect to movement direction X, when screen 1 is located at the hold position, depending on a position on front surface 11 of screen 1 in the longitudinal direction, a difference in distance to projection unit 4 in movement direction X occurs. When screen 1 is moved in movement direction X in synchronization with a change in irradiation position of the light from irradiation unit 3 in the longitudinal direction so as to cancel the difference in distance, the irradiation position of the light from irradiation unit 3 on front surface 11 in screen 1 is unchanged in movement direction X. Accordingly, second image 702 is formed (projected) on screen 1. The "second image" mentioned herein is image 700 formed on front surface 11 or rear surface 12 of screen 1, which is formed along reference plane 503. When second image 702 is projected onto windshield 101 from projection unit 4, user 200 visually recognizes second virtual image 302 formed in front of vehicle 100 through windshield 101.

For example, when the irradiation position of the light from irradiation unit 3 on front surface 11 in screen 1 moves closer to first end part 111 in the longitudinal direction, if screen 1 moves toward first direction X1, a distance from projection unit 4 to the irradiation position in movement direction X becomes substantially constant. In contrast, when the irradiation position of the light from irradiation unit 3 on front surface 11 in screen 1 moves closer to second end part 112 in the longitudinal direction, if screen 1 moves toward second direction X2, the distance from projection unit 4 to the irradiation position in movement direction X becomes substantially constant. With this configuration, second virtual image 302 serving as virtual image 300 is formed on second virtual plane 502 inclined at inclination angle β (for example, 90 degrees) with respect to optical axis 500.

Accordingly, for example, when irradiation unit 3 irradiates screen 1 moving along second direction X2 with light from first end part 111 toward second end part 112, second virtual image 302 that is visually recognized while being erected upright on road surface 600 at the certain distance from user 200 is formed. As illustrated in FIG. 8, the viewing distance from eye point Pe1 to second virtual image 302 formed at this time becomes substantially equal on a side closer to first end part 111 (a side closer to an upper end part) of screen 1 and on a side closer to second end part 112 (a side closer to an lower end part) of screen 1. In other words, when viewed from user 200, second virtual image 302 becomes a virtual image whose viewing distance is substantially equal on the side closer to the upper end and on the side closer to the lower side in the vertical direction (the vertical direction in FIG. 2).

In here, in the present exemplary embodiment, a scanning range of irradiation unit 3 in the longitudinal direction is set narrower when second virtual image 302 is formed than when first virtual image 301 is formed. In other words, in image 700 formed on front surface 11 of screen 1, a longitudinal direction of second image 702 is set smaller than that of first image 701. With this configuration, for example, as illustrated in FIG. 2, a vertical dimension of each second virtual image 302 becomes smaller than a vertical dimension of first virtual image 301 in the view field of user 200.

Figure 9:
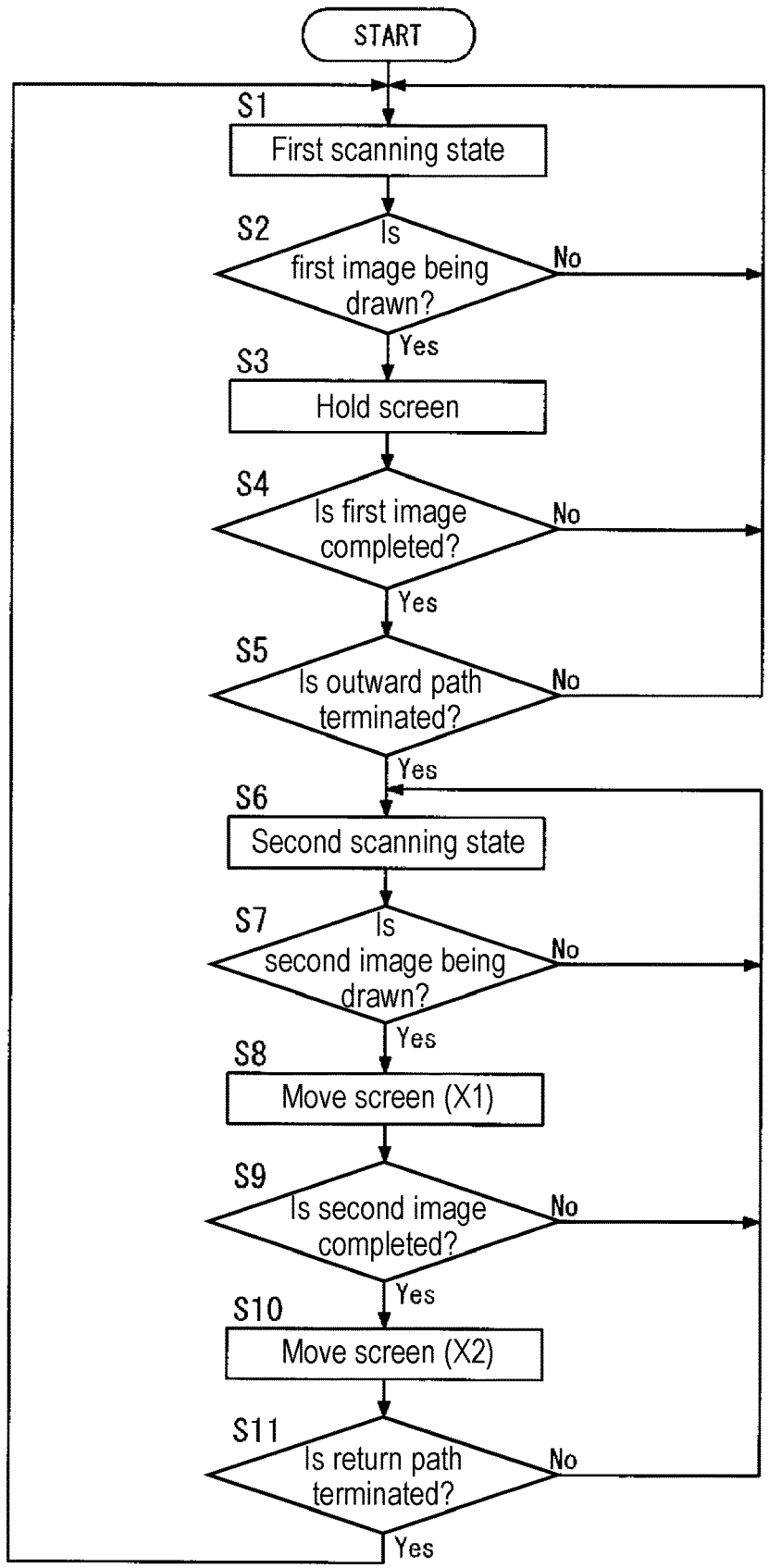
FIG. 9 is a flowchart illustrating an operation example of the display device illustrated in FIG. 3.

FIG. 9 is a flowchart illustrating an operation example of display device 10 when both first virtual image 301 and second virtual image 302 are projected. Herein, as an example, a case where irradiation unit 3 projects first virtual image 301 in the "outward path" in which the light is scanned from first end part 111 toward second end part 112, and projects second virtual image 302 in the "return path" in which the light is scanned from second end part 112 toward first end part 111 is exemplified.

As illustrated in FIG. 9, when starting a display operation (projection of virtual image 300), display device 10 first performs a process for forming (projecting) first virtual image 301 in the "outward path". In other words, controller 5 controls irradiation unit 3 so as to operate in the first scanning state (S1). This causes irradiation unit 3 to scan (raster-scan) front surface 11 of screen 1 from first end part 111 toward second end part 112. At this time, controller 5 determines whether first image 701 is being drawn each time one scan line is drawn along the lateral direction (S2). When first image 701 is not being drawn (S2: No), controller 5 returns to the display operation of process S1 to cause irradiation unit 3 to continue to scan.

In process S2, when first image 701 is being drawn (S2: Yes), controller 5 controls drive unit 2 such that screen 1 is held at the hold position (also referred to as a "reference position") (S3). Controller 5 determines whether first image 701 is completed (S4). When first image 701 is not completed (S4: No), processes S1 to S4 are repeated to draw first image 701. Those processes S1 to S4 correspond to a first process for forming first virtual image 301 in a method for controlling display device 10. In other words, first image 701 is drawn with screen 1 being held at the hold position in the "outward path".

When first image 701 is completed (S4: Yes), controller 5 determines whether the outward path is terminated (the irradiation position reaches second end part 112) (S5). When the outward path is not terminated (S5: No), processes S1 to S5 are repeated. With this configuration, in the "outward path", first image 701 is formed (projected) on screen 1. First image 701 is projected from projection unit 4 onto windshield 101, thereby forming first virtual image 301 extending along road surface 600 in target space 400.

When the outward path is terminated (S5: Yes), display device 10 performs a process for forming (projecting) second virtual image 302 in the "return path". In other words, controller 5 controls irradiation unit 3 so as to operate in the second scanning state (S6). This causes irradiation unit 3 to scan (raster-scan) front surface 11 of screen 1 from second end part 112 toward first end part 111. At this time, controller 5 determines whether second image 702 is being drawn each time one scan line is drawn along the lateral direction (S7). When second image 702 is not being drawn (S7: No), controller 5 returns to process S6 to cause irradiation unit 3 to continue to scan.

In process S7, when second image 702 is being drawn (S7: Yes), controller 5 controls drive unit 2 so as to move screen 1 along first direction X1 (S8). Controller 5 determines whether second image 702 is completed (S9). When second image 702 is not completed (S9: No), controller 5 repeats processes S6 to S9 to draw second image 702. Those processes S6 to S9 correspond to a second process for forming second virtual image 302 in the method for controlling display device 10. Herein, during a period when second image 702 is being drawn, a movement speed of screen 1 moving along first direction X1 is constant (constant speed) at a prescribed speed. In other words, in the "return path", each time one scan line is drawn along the lateral direction, second image 702 is drawn while moving screen 1 so as to separate from irradiation unit 3 (approach projection unit 4).

When second image 702 is completed (S9: Yes), controller 5 controls drive unit 2 so as to move screen 1 along second direction X2 to return screen 1 to the reference position (S10). Controller 5 then determines whether the return path is terminated (the irradiation position reaches first end part 111) (S11). When the return path is not terminated (S11: No), processes S6 to S11 are repeated. With this configuration, in the "return path", second image 702 is formed (projected) on screen 1. Second image 702 is projected from projection unit 4 onto windshield 101, thereby forming second virtual image 302 being erected upright on road surface 600 at the certain distance from user 200 in target space 400.

When the return path is terminated (S11: Yes), display device 10 returns to process S1 and performs a process for forming (projecting) first virtual image 301 in the "outward path". Display device 10 repeatedly performs processes S1 to S11 described above while the display operation (the projection of virtual image 300) is continued. With this configuration, first virtual image 301 is formed in target space 400 in the "outward path", and second virtual image 302 is formed in target space 400 in the "return path". As a result, during a period when the irradiation position of the light from irradiation unit 3 reciprocates between first end part 111 and second end part 112 on front surface 11 of screen 1 one time, first virtual image 301 and second virtual image 302 are formed in target space 400. Scanning in the longitudinal direction is performed in irradiation unit 3 relatively fast, so that user 200 visually recognizes as if first virtual image 301 and second virtual image 302 were displayed simultaneously. A frequency of scanning in the longitudinal direction in irradiation unit 3 is, for example, not less than 60 Hz.

Figure 10A:
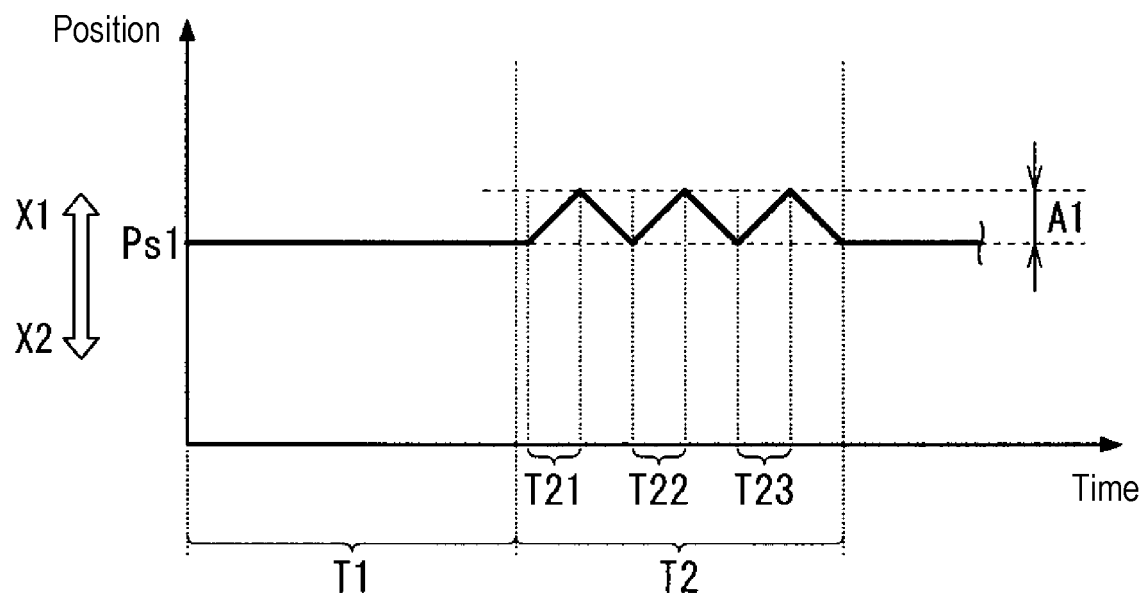
FIG. 10A is a graph illustrating temporal changes of a position of the screen in the display device illustrated in FIG. 3.
Figure 10B:
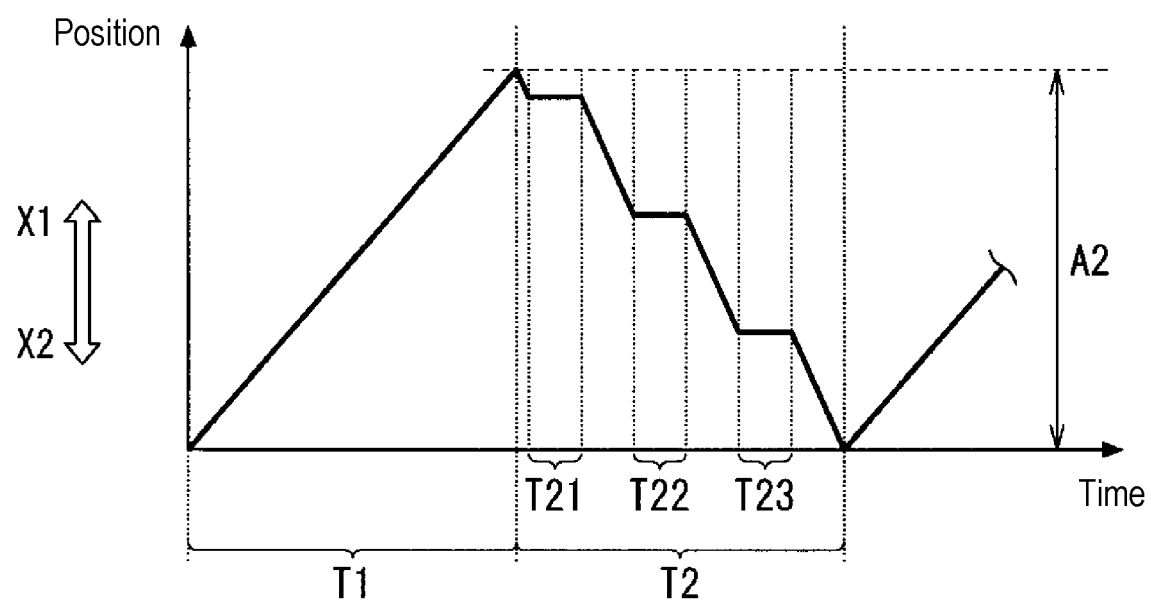
FIG. 10B is a graph illustrating temporal changes of a position of a screen in a comparative example.

FIG. 10A is a graph illustrating temporal changes of a position of screen 1 in movement direction X when display device 10 operates according to the flowchart illustrated in FIG. 9. FIG. 10B is a similar graph of a comparative example in which screen 1 is disposed such that front surface 11 of screen 1 is orthogonal to movement direction X. In FIGS. 10A and 10B, a horizontal axis is a time axis, and the position of screen 1 is indicated along a vertical axis.

As illustrated in FIG. 10A, in period T1 of the "outward path" in which irradiation unit 3 scans screen 1 with the light from first end part 111 toward second end part 112, the position of screen 1 in movement direction X is held at reference position Ps1. In other words, with screen 1 being held at reference position Ps1, first image 701 is formed on screen 1, thereby forming first virtual image 301 in target space 400.

On the other hand, in period T2 of the "return path" in which irradiation unit 3 scans screen 1 with the light from second end part 112 toward first end part 111, the position of screen 1 in movement direction X is changed in synchronization with timing when second image 702 is drawn. In this case, in period T2, each of periods T21, T22, and T23 represents a period when second image 702 is being drawn. In other words, with screen 1 being moved from reference position Ps1 along first direction X1, second image 702 is formed on screen 1, thereby forming second virtual image 302 in target space 400. At this time, a moving speed of screen 1 is constant. Each time second image 702 is formed, screen 1 is moved along second direction X2 to return to reference position Ps1. During periods T21, T22, and T23, the process for forming second image 702, as described above, is performed a plurality of times (three times, in this case), thereby forming a plurality (three pieces, in this case) of second virtual images 302 each having a different viewing distance from each other in target space 400 (see FIG. 2). As exemplified in FIG. 10A, in period T21 when second image 702 is formed near second end part 112, the viewing distance of second virtual image 302 is shortest, and in period T23 when second image 702 is formed near first end part 111, the viewing distance of second virtual image 302 is longest.

In contrast, in the comparative example, as illustrated in FIG. 10B, in period T1 of the "outward path", screen 1 is continued to move along first direction X1 to project first virtual image 301. On the other hand, in period T2 of the "return path", screen 1 is stopped only during periods T21, T22, and T23 when second image 702 is being drawn, and screen 1 is continued to move along second direction X2 during periods other than periods T21, T22, and T23.

As described above, in display device 10 according to the present exemplary embodiment, screen 1 only needs to move with amplitude for drawing second image 702, that is, amplitude indicated by "A1" in FIG. 10A. In contrast, in the comparative example, screen 1 needs to move with amplitude for drawing first image 701, that is, amplitude indicated by "A2" in FIG. 10B. Accordingly, display device 10 according to the present exemplary embodiment is different from the comparative example in moving range of screen 1, whereby display device 10 according to the present exemplary embodiment can reduce the moving range of screen 1 to be smaller (A1<A2). The reduced moving range of screen 1 leads to a decrease in size of drive unit 2 (actuator) for moving screen 1, a reduction in power consumption of drive unit 2, and a reduction in operating sound of drive unit 2, for example.

(4) Summary

As described above, display device 10 according to the present exemplary embodiment includes screen 1, drive unit 2, irradiation unit 3, and projection unit 4. Screen 1 has the display plane (front surface 11) inclined with respect to reference plane 503. Drive unit 2 is configured to move screen 1 between first position Po1 and second position Po2 in movement direction X orthogonal to reference plane 503. Irradiation unit 3 includes imaging optical system 323, and is configured to cause imaging optical system 323 to irradiate screen 1 with light to scan the display plane (front surface 11) of screen 1 to form image 700 on the display plane (front surface 11). Projection unit 4 receives light that is transmitted through screen 1 and is output from screen 1 along movement direction X as incident light, and forms virtual image 300 corresponding to image 700 in target space 400 by the incident light. A locus of focal position Pf1 of imaging optical system 323 when irradiation unit 3 wholly scans the display plane (front surface 11) is within a range between the display plane (front surface 11) of screen 1 at first position Po1 and the display plane (front surface 11) of screen 1 at second position Po2.

With the configuration, as the display plane of screen 1 is inclined with respect to reference plane 503, the moving range of screen 1 becomes narrower. When the moving range of screen 1 becomes narrower, variations in size of luminescent spots B11, B12, and B13 to be formed on front surface 11 of screen 1 as screen 1 moves can be suppressed relatively lower. Furthermore, a locus of focal position Pf1 of imaging optical system 323 when irradiation unit 3 wholly scans the display plane is within a range between the display plane of screen 1 at first position Po1 and the display plane of screen 1 at second position Po2. Therefore, even when screen 1 is in a state inclined with respect to reference plane 503, variations in size of luminescent spots B11, B12, and B13 to be formed on front surface 11 of screen 1 can be kept lower as much as possible. As a result, in display device 10, resolution of image 700 formed on screen 1 by light from irradiation unit 3 can be suppressed from lowering, advantageously suppressing resolution of virtual image 300 from lowering.

As described in the present exemplary embodiment, display device 10 may further preferably include controller 5 configured to control drive unit 2 and irradiation unit 3. When forming first virtual image 301 serving as virtual image 300 on first virtual plane 501 whose inclination angle α with respect to optical axis 500 of projection unit 4 is smaller than predetermined value γ, controller 5 is configured to hold screen 1 in movement direction X. When forming second virtual image 302 serving as virtual image 300 on second virtual plane 502 whose inclination angle β with respect to optical axis 500 of projection unit 4 is larger than predetermined value γ, controller 5 is configured to move screen 1 in movement direction X.

With this configuration, first virtual image 301 whose inclination angle α with respect to optical axis 500 of projection unit 4 is relatively small, that is, first virtual image 301 whose angle with respect to road surface 600 is shallow when viewed from user 200 is projected with screen 1 being held. Therefore, an advantage in which the moving range of screen 1 can be reduced to be small can be obtained, in comparison with the comparative example that moves screen 1 when projecting first virtual image 301. When the moving range of screen 1 becomes narrower, variations in size of luminescent spots B11, B12, and B13 on front surface 11 of screen 1 as screen 1 moves can be further suppressed.

As illustrated in the present exemplary embodiment, the moving body (e.g., vehicle 100) includes display device 10, and the reflective member (e.g., windshield 101) configured to reflect light from projection unit 4.

With the configuration, as the display plane of screen 1 is inclined with respect to reference plane 503, the moving range of screen 1 becomes narrower. When the moving range of screen 1 becomes narrower, variations in size of luminescent spots B11, B12, and B13 to be formed on front surface 11 of screen 1 as screen 1 moves can be suppressed relatively lower. Furthermore, a locus of focal position Pf1 of imaging optical system 323 when irradiation unit 3 wholly scans the display plane is within a range between the display plane of screen 1 at first position Po1 and the display plane of screen 1 at second position Po2. Therefore, even when screen 1 is in a state inclined with respect to reference plane 503, variations in size of luminescent spots B11, B12, and B13 to be formed on front surface 11 of screen 1 can be kept lower as much as possible. As a result, in display device 10, resolution of image 700 formed on screen 1 by light from irradiation unit 3 can be suppressed from lowering, advantageously suppressing resolution of virtual image 300 from lowering.

(5) Modifications

The first exemplary embodiment is merely one of various exemplary embodiments of the present disclosure. The first exemplary embodiment can be variously modified in accordance with a design, for example, as long as the object of the present disclosure can be achieved. Furthermore, the aspect according to the first exemplary embodiment is not limited to be embodied by a display device alone. The aspect according to the first exemplary embodiment may be embodied by a system, a method for controlling a display device, a computer program, or a recording medium storing a program, for example.

Hereinafter, modifications of the first exemplary embodiment will be listed. The modifications described below can be applied while being combined as appropriate.

Imaging optical system 323 is not limited to a telecentric lens system. A lens system having a convergence or divergence effect can be used. In this case, a difference in magnification of image 700 formed on screen 1 when screen 1 moves in movement direction X depending on a position of screen 1 may lead to trapezoidal distortion, for example, on virtual image 300. Such a kind of trapezoidal distortion, for example, can be reduced through an image correction.

Screen 1 may preferably include a lenticular lens for allowing front surface 11 to have light-diffusing property. Furthermore, screen 1 may further include a lenticular lens on rear surface 12. In this case, it is preferable that a ridge line of the lenticular lens on front surface 11 and a ridge line of the lenticular lens on rear surface 12 be orthogonal to each other to allow light-diffusing directions to be orthogonal to each other. Instead of the lenticular lens, screen 1 may include a fly eye lens on front surface 11 or rear surface 12.

Figure 11:
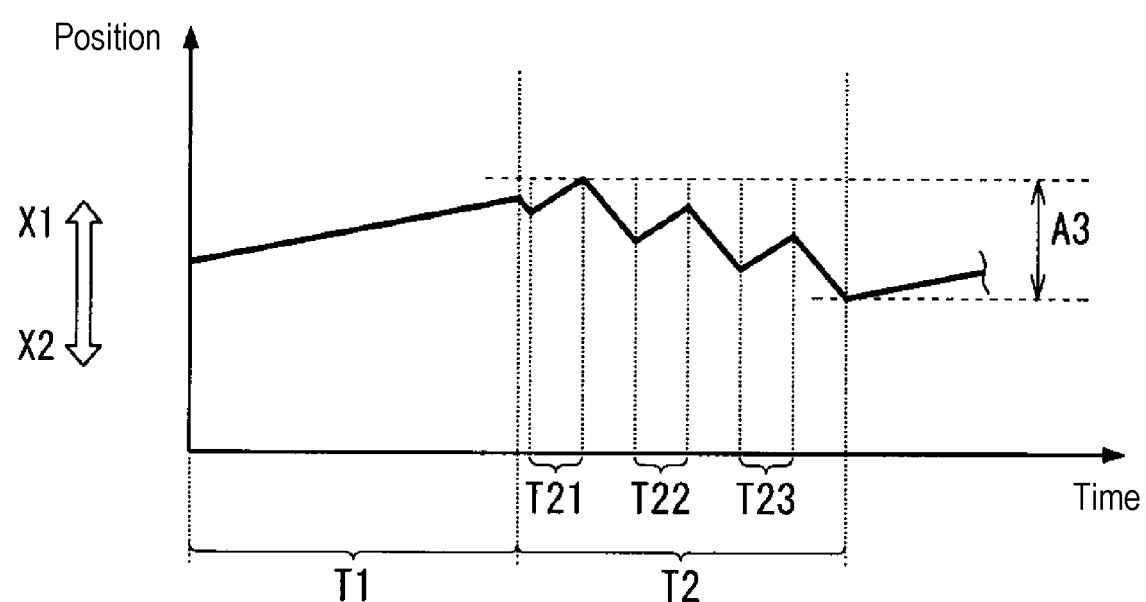
FIG. 11 is a graph illustrating temporal changes of a position of a screen in a display device according to a modification to the first exemplary embodiment of the present disclosure.

Controller 5 is not limited to such a configuration that, when first virtual image 301 is to be formed, screen 1 is held in movement direction X. For example, as illustrated in FIG. 11, such a configuration may be applied that, when first virtual image 301 is to be formed, screen 1 moves in movement direction X. In FIG. 11, a horizontal axis is a time axis, and the position of screen 1 is indicated along a vertical axis. That is, as illustrated in FIG. 11, in period T1 of an "outward path", where irradiation unit 3 emits light to perform scanning from first end part 111 to second end part 112, controller 5 keeps causing screen 1 to move in first direction X1. On the other hand, in period T2 of a "return path", only in periods T21, T22, and T23, where second images 702 are in drawing, controller 5 causes screen 1 to move in first direction X1, and, in other periods, controller 5 causes screen 1 to move in second direction X2. In the present modification, although screen 1 is required to move at amplitude indicated by "A3" in FIG. 11, the moving range of screen 1 can be kept narrower, compared with the comparative example (see FIG. 10B) described above (A3<A2).

In screen 1, the "display plane" may be at least a plane used to form image 700. The display plane is not limited to front surface 11 of screen 1, but may be rear surface 12 of screen 1, for example. Furthermore, front surface 11 (or rear surface 12) of screen 1 does not wholly serve as a "display plane". The "display plane" may be a partial region on front surface 11 (or rear surface 12) of screen 1. In this case, image 700 is to be formed on the partial region on front surface 11 (or rear surface 12) of screen 1.

Controller 5 may have a configuration for controlling drive unit 2 and irradiation unit 3, and a function for controlling drive unit 2 and a function for controlling irradiation unit 3 may not be integrated. For example, a controller that controls drive unit 2 and a controller that controls irradiation unit 3 may be separately provided and may synchronize with each other.

Display device 10 is not limited to the configuration that simultaneously projects first virtual image 301 and second virtual image 302, and may have a mode for projecting only first virtual image 301 and a mode for projecting only second virtual image 302, for example.

The operation state of irradiation unit 3 may be only either the first scanning state (outward path) or the second scanning state (return path). In this case, first virtual image 301 and second virtual image 302 are formed in either the first scanning state (outward path) or the second scanning state (return path).

Furthermore, in the first exemplary embodiment, the configuration in which first virtual image 301 is formed only in the first scanning state (outward path) and second virtual image 302 is formed only in the second scanning state (return path) has been described, but the present disclosure is not limited to this configuration. For example, first virtual image 301 may be formed only in the second scanning state (return path) and second virtual image 302 may be formed only in the first scanning state (outward path). Alternatively first virtual image 301 or second virtual image 302 may be formed in both the first scanning state (outward path) and the second scanning state (return path). Furthermore, both first virtual image 301 and second virtual image 302 may be formed in both the first scanning state (outward path) and the second scanning state (return path). In this case, in at least parts of first virtual image 301 and second virtual image 302, if identical virtual image 300 is formed in both the first scanning state (outward path) and the second scanning state (return path), intensity of virtual image 300 can be increased.

The scanning range of irradiation unit 3 on front surface 11 of screen 1 in the longitudinal direction inclined with respect to reference plane 503 may be wider when second virtual image 302 is formed than when first virtual image 301 is formed.

As illustrated in FIG. 2, forming the plurality (three pieces, in this case) of second virtual images 302 each having the different viewing distance from each other in target space 400 is not essential to display device 10. Only single second virtual image 302 may be formed in target space 400.

Screen 1 is not limited to the configuration in which only front surface 11 of screen 1 has the light-diffusing property. For example, only rear surface 12 or both front surface 11 and rear surface 12 may have the light-diffusing property. In a case where rear surface 12 of screen 1 has the light-diffusing property, image 700 is formed on rear surface 12 of screen 1.

Furthermore, display device 10 is not limited to the configuration of forming virtual image 300 in target space 400 set in front of vehicle 100 in the traveling direction. For example, display device 10 may form virtual image 300 on a side portion, rear portion, upper portion and the like in the traveling direction of vehicle 100.

Screen 1 is not only rectilinearly moved in movement direction X. For example, screen 1 may be rotatable so as to change inclination angle θ of front surface 11 with respect to reference plane 503.

Projection unit 4 may include or may not include a relay optical system for forming an intermediate image.

In addition, display device 10 is not limited to the head-up display for use in vehicle 100. For example, display device 10 is also applicable as a display for a moving body other than vehicle 100, the other mobile body including a motorcycle, a train, an aircraft, a construction machine, a vessel, and the like. Moreover, the place of use of display device 10 is not limited to the moving body. For example, display device 10 may be used in an amusement facility. Display device 10 may also be used as a wearable terminal such as a head mounted display (HMD). Furthermore, display device 10 may be used at a medical facility, and may be used as a stationary device.

Second Exemplary Embodiment

Display device 10 according to the present exemplary embodiment differs, in terms of a configuration of scanner 32 in irradiation unit 3, from display device 10 according to the first exemplary embodiment. Hereinafter, constituent elements identical to those of the first exemplary embodiment are denoted by like reference signs and explanations thereof will be omitted.

Figure 12:
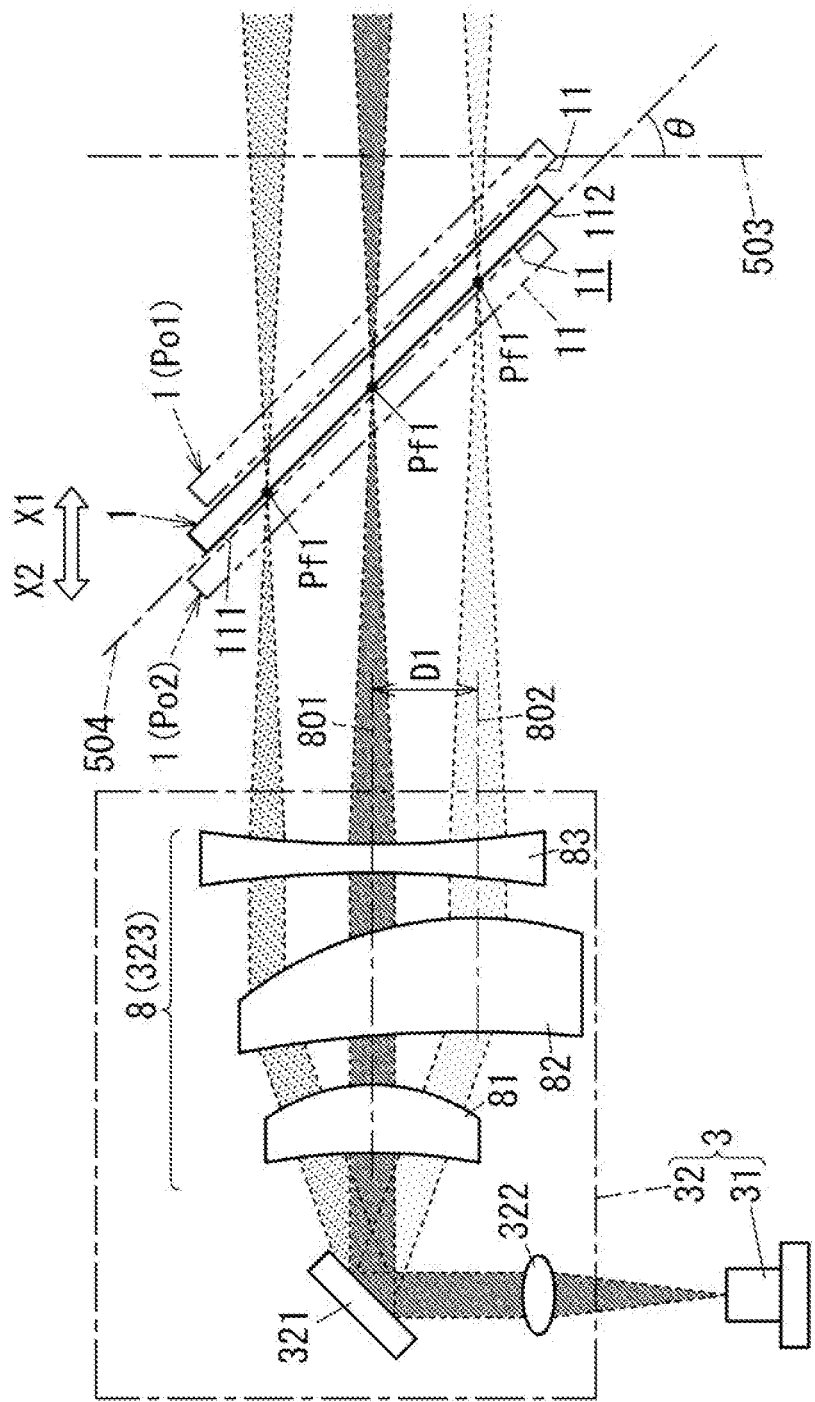
FIG. 12 is a conceptual diagram illustrating a configuration of an irradiation unit in a display device according to a second exemplary embodiment of the present disclosure.

In the present exemplary embodiment, as illustrated in FIG. 12, imaging optical system 323 includes eccentric optical system 8. As exemplified in FIG. 12, eccentric optical system 8 includes a group of lenses including first optical lens 81 formed from a convex meniscus lens, second lens 82 formed from a convex meniscus lens, and third lens 83 formed from a both-side concave lens. First lens 81, second lens 82, and third lens 83 are disposed and aligned in movement direction X, where first lens 81 is most proximal to mirror unit 321, whereas third lens 83 is most distal from mirror unit 321. In such a positional relationship that optical axis 801 of first lens 81 and third lens 83 and optical axis 802 of second lens 82 are away from each other at distance D1, first lens 81, second lens 82, and third lens 83 constitute eccentric optical system 8. Specifically, optical axis 802 of second lens 82 is at a position shifted at distance D1 toward second end part 112 (downward in FIG. 12) in the longitudinal direction with respect to optical axis 801 of first lens 81 and third lens 83.

With eccentric optical system 8 having the configuration described above, as illustrated in FIG. 12, eccentric optical system 8 causes a locus of focal position Pf1 when irradiation unit 3 wholly scans the display plane (front surface 11) to be formed inclined with respect to reference plane 503 along front surface 11. That is, image plane 504 to be formed with a locus of focal position Pf1 of imaging optical system 323 is a plane along front surface 11 of screen 1.

As exemplified in FIG. 12, image plane 504 is inclined at angle θ with respect to reference plane 503, and is a plane parallel to the display plane, i.e., to front surface 11 of screen 1. In other words, a locus of focal position Pf1 when irradiation unit 3 wholly scans the display plane (front surface 11) is to be formed on image plane 504 parallel to front surface 11.

Furthermore, in the present exemplary embodiment, image plane 504 lies at an equal distance from both of the display plane (front surface 11) of screen 1 at first position Po1 and the display plane (front surface 11) of screen 1 at second position Po2. Therefore, as illustrated in FIG. 12, in a state where screen 1 lies at a center of the moving range, front surface 11 of screen 1 and image plane 504 align with each other, and a locus of focal position Pf1 of imaging optical system 323 is to be formed on front surface 11 of screen 1.

As described above, in display device 10 according to the present exemplary embodiment, imaging optical system 323 includes eccentric optical system 8. Eccentric optical system 8 is configured to cause a locus of focal position Pf1 when irradiation unit 3 wholly scans the display plane (front surface 11) to be formed inclined with respect to reference plane 503 along the display plane (front surface 11). With display device 10, a locus of focal position Pf1 when irradiation unit 3 wholly scans the display plane (front surface 11) lies along front surface 11 serving as the display plane. Therefore, while a locus of focal position Pf1 of imaging optical system 323 is within a range between the display plane of screen 1 at first position Po1 and the display plane of screen 1 at second position Po2, the moving range of screen 1 can be further narrowed. Therefore, variations in size of a luminescent spot on front surface 11 of screen 1 as screen 1 moves are further suppressed. As a result, in display device 10, resolution of image 700 formed on screen 1 by light from irradiation unit 3 can be increased, advantageously increasing resolution of virtual image 300.

As illustrated in the present exemplary embodiment, a locus of focal position Pf1 when irradiation unit 3 wholly scans the display plane (front surface 11) may be preferably formed on image plane 504 parallel to the display plane (front surface 11). With the configuration, in a state where screen 1 is held at a hold position, a size of luminescent spot to be formed on a display plane becomes substantially uniform. Therefore, resolution of virtual image 300 (first virtual image 301) to be projected in a state where screen 1 is held at a hold position can be suppressed from varying.

As illustrated in the present exemplary embodiment, image plane 504 may preferably lie at an equal distance from both of the display plane (front surface 11) of screen 1 at first position Po1 and the display plane (front surface 11) of screen 1 at second position Po2. With the configuration, a size of a luminescent spot to be formed on a display plane of screen 1 at first position Po1 and a size of a luminescent spot to be formed on a display plane of screen 1 at second position Po2 can be kept uniform. Therefore, resolution of virtual image 300 (second virtual image 302) to be projected while screen 1 is moving can be suppressed from varying.

Eccentric optical system 8 (first lens 81, second lens 82, and third lens 83) described in the second exemplary embodiment is merely an example. For example, eccentric optical system 8 may include a maximum of two lenses or four or more lenses.

As a modification to the second exemplary embodiment, display device 10 may preferably include an aberration correction function configured to correct chromatic aberrations or monochromatic aberrations. Therefore, resolution of virtual image 300 can be further increased.

Forming a locus of focal position Pf1 when irradiation unit 3 wholly scans the display plane (front surface 11) on image plane 504 parallel to front surface 11 is not an essential configuration for display device 10 according to the present exemplary embodiment. That is, image plane 504 may not be parallel to the display plane, i.e., to front surface 11 of screen 1.

Allowing image plane 504 to lie at an equal distance to both of the display plane (front surface 11) of screen 1 at first position Po1 and the display plane (front surface 11) of screen 1 at second position Po2 is not an essential configuration for display device 10 according to the present exemplary embodiment. That is, as long as image plane 504 is within a range between the display plane of screen 1 at first position Pot and the display plane of screen 1 at second position Po2, image plane 504 may lie closer to either of the display planes.

The configuration of display device 10 according to the second exemplary embodiment (including the modifications) can be combined with the configuration of display device 10 according to the first exemplary embodiment (including the modifications) as appropriate.

Third Exemplary Embodiment

Figure 13:
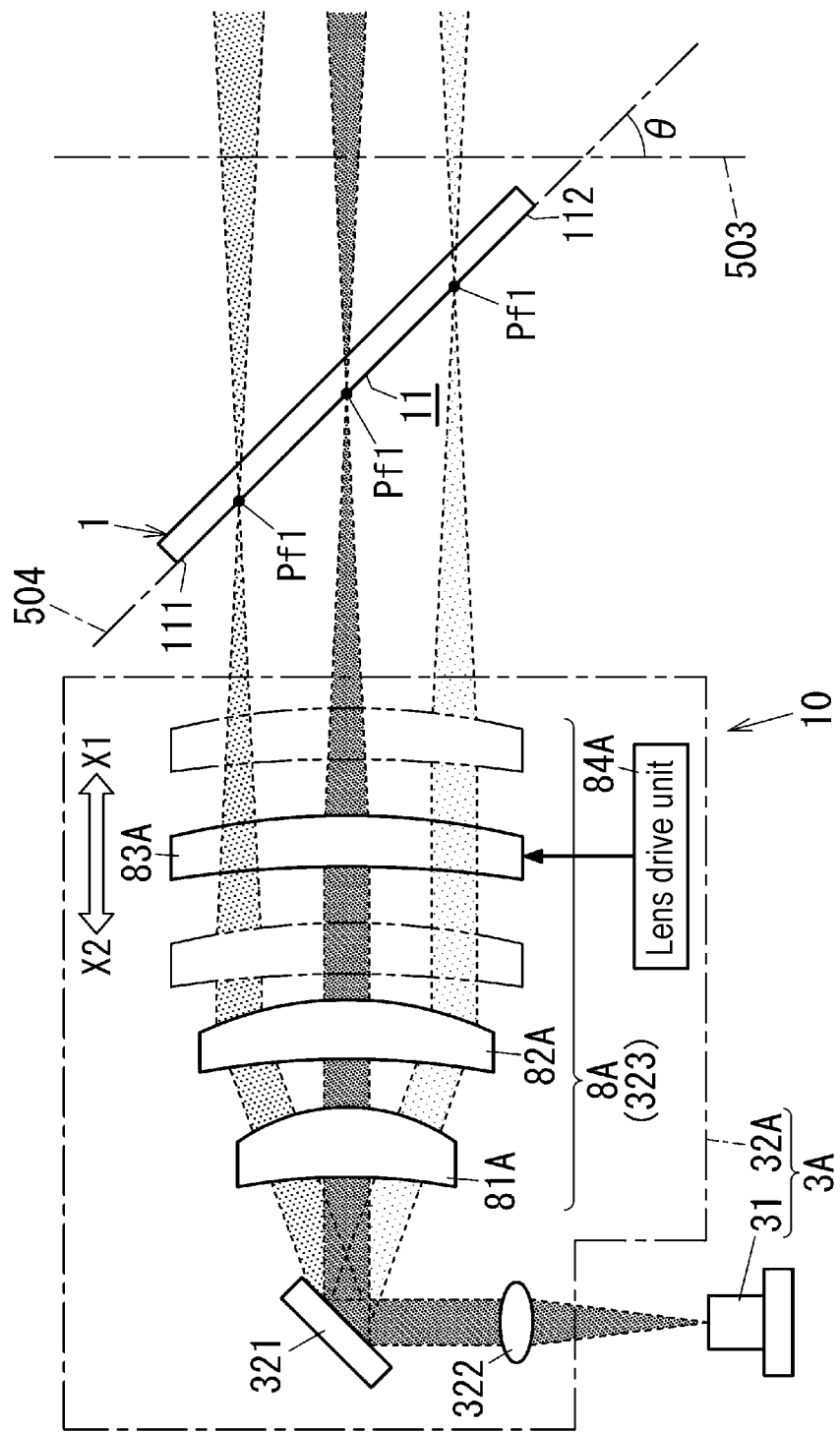
FIG. 13 is a conceptual diagram illustrating a configuration of an irradiation unit in a display device according to a third exemplary embodiment of the present disclosure.

Display device 10 according to the present exemplary embodiment differs, in terms of a configuration of scanner 32A in irradiation unit 3A, as illustrated in FIG. 13, from display device 10 according to the second exemplary embodiment. Hereinafter, constituent elements identical to those of the second exemplary embodiment are denoted by like reference signs and explanations thereof will be omitted.

In the present exemplary embodiment, imaging optical system 323 includes, as illustrated in FIG. 13, a group of focusing lenses 8A configured to move focal position Pf1 in movement direction X. As exemplified in FIG. 13, the group of focusing lenses 8A includes a group of lenses constituting a coaxial optical system including first lens 81A formed from a convex meniscus lens, second lens 82A formed from a convex meniscus lens, and third lens 83A formed from a convex meniscus lens. Imaging optical system 323 further includes lens drive unit 84A configured to drive third lens 83A to drive the group of focusing lenses 8A. First lens 81A, second lens 82A, and third lens 83A are disposed and aligned in movement direction X, where first lens 81A is most proximal to mirror unit 321, whereas third lens 83A is most distal from mirror unit 321. Lens drive unit 84A moves third lens 83A in movement direction X to change focal position Pf1 of imaging optical system 323 in movement direction X. For example, when third lens 83A is moved in first direction X1, focal position Pf1 of imaging optical system 323 moves in first direction X1. On the other hand, when third lens 83A is moved in second direction X2, focal position Pf1 of imaging optical system 323 moves in second direction X2.

Lens drive unit 84A is configured to drive third lens 83A of the group of focusing lenses 8A in synchronization with scanning by irradiation unit 3A to allow a locus of focal position Pf1 when irradiation unit 3A wholly scans the display plane (front surface 11) to lie along the display plane. Specifically, lens drive unit 84A follows a second control signal from controller 5 (see FIG. 3) to operate to move focal position Pf1 of imaging optical system 323 in movement direction X in synchronization with operation of scanner 32A. In an "outward path" where an operation state of irradiation unit 3A is in the first scanning state, lens drive unit 84A moves third lens 83A to allow focal position Pf1 to move in first direction X1. In a "return path" where an operation state of irradiation unit 3A is in the second scanning state, lens drive unit 84A moves third lens 83A to allow focal position Pf1 to move in second direction X2.

With imaging optical system 323 configured as described above, as illustrated in FIG. 13, a locus of focal position Pf1 when irradiation unit 3A wholly scans the display plane (front surface 11) is to be formed inclined with respect to reference plane 503 to lie along front surface 11. That is, image plane 504 to be formed with a locus of focal position Pf1 of imaging optical system 323 is a plane along front surface 11 of screen 1.

As exemplified in FIG. 13, image plane 504 is inclined at angle θ with respect to reference plane 503, and is a plane parallel to the display plane, i.e., to front surface 11 of screen 1. In other words, a locus of focal position Pf1 when irradiation unit 3A wholly scans the display plane (front surface 11) is to be formed on image plane 504 parallel to front surface 11.

As described above, in display device 10 according to the present exemplary embodiment, imaging optical system 323 includes the focusing lenses (group of focusing lenses 8A) and lens drive unit 84A both configured to move focal position Pf1 in movement direction X. Lens drive unit 84A is configured to drive the focusing lens (third lens 83A) in synchronization with scanning by irradiation unit 3A to allow a locus of focal position Pf1 when irradiation unit 3A wholly scans the display plane (front surface 11) to lie along the display plane (front surface 11). With display device 10, a locus of focal position Pf1 when irradiation unit 3 wholly scans the display plane (front surface 11) lies along front surface 11 serving as the display plane. Therefore, while a locus of focal position Pf1 of imaging optical system 323 is within a range between the display plane of screen 1 at first position Po1 and the display plane of screen 1 at second position Po2, the moving range of screen 1 can be further narrowed. Therefore, variations in size of a luminescent spot on front surface 11 of screen 1 as screen 1 moves are further suppressed. As a result, in display device 10, resolution of image 700 formed on screen 1 by light from irradiation unit 3 can be increased, advantageously increasing resolution of virtual image 300.

Furthermore, in display device 10 according to the third exemplary embodiment, as long as a change in angle of view does not occur during focusing, imaging optical system 323 does not require telecentric property. When a change in angle of view can occur during focusing, for example, a function of electronically correcting a change in angle of view can be applied.

The group of focusing lenses 8A (first lens 81A, second lens 82A, and third lens 83A) described in the third exemplary embodiment is merely an example. For example, the group of focusing lenses 8A may include a maximum of two lenses, or four or more lenses.

Lens drive unit 84A may drive the group of focusing lenses 8A in synchronization with not only scanning by irradiation unit 3A, but also, for example, moving of screen 1. In this case, for example, when screen 1 moves in first direction X1, lens drive unit 84A moves third lens 83A to allow focal position Pf1 to move in first direction X1.

The configuration of display device 10 according to the third exemplary embodiment (including the modifications) can be combined with the configuration of display device 10 according to the second exemplary embodiment (including the modifications) as appropriate.

Fourth Exemplary Embodiment

Figure 14:
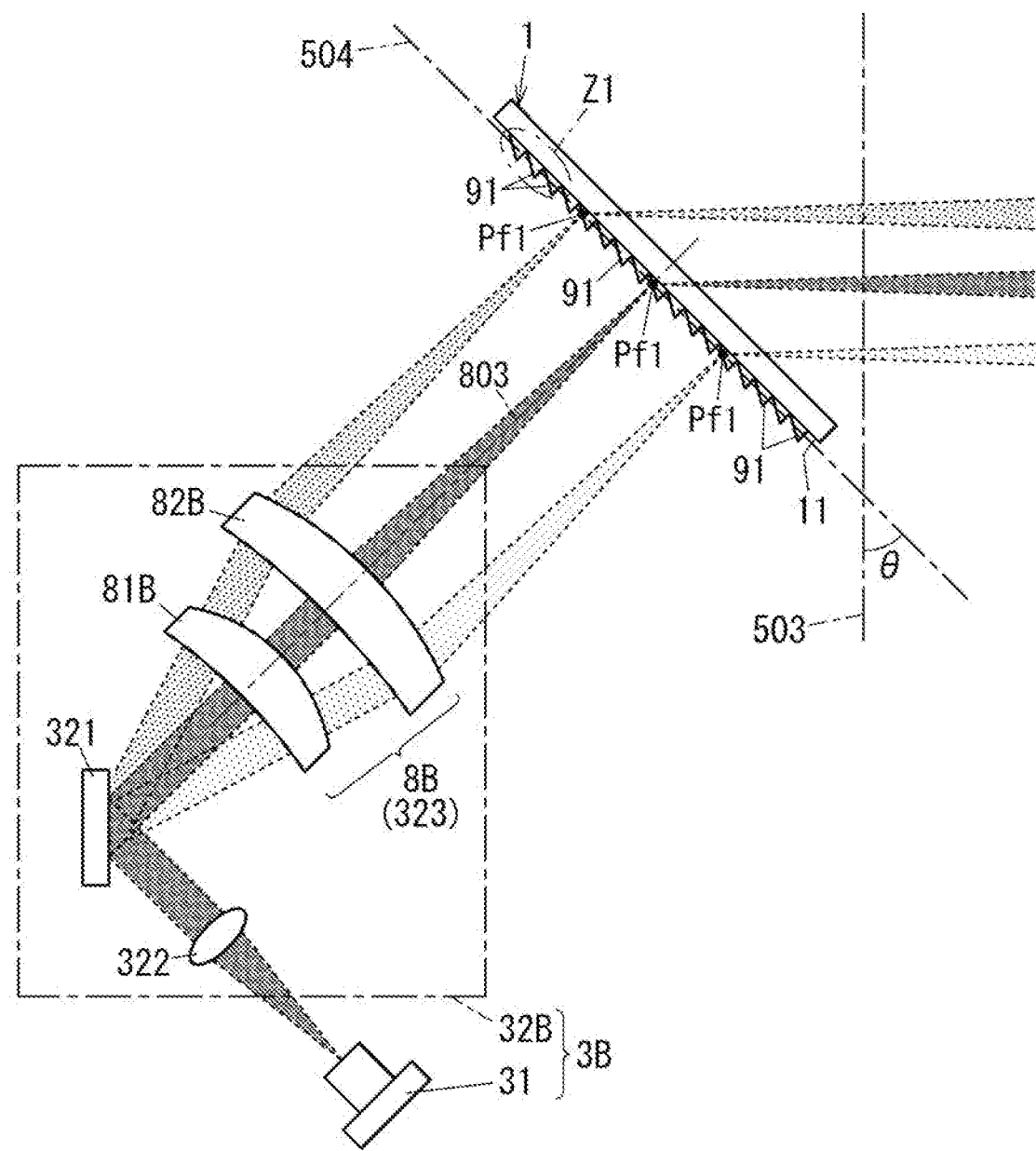
FIG. 14 is a conceptual diagram illustrating a configuration of an irradiation unit in a display device according to a fourth exemplary embodiment of the present disclosure.

Display device 10 according to the present exemplary embodiment differs, in terms of a configuration of scanner 32B in irradiation unit 3B, as illustrated in FIG. 14, from display device 10 according to the second exemplary embodiment. Hereinafter, constituent elements identical to those of the second exemplary embodiment are denoted by like reference signs and explanations thereof will be omitted.

In the present exemplary embodiment, imaging optical system 323 includes, as illustrated in FIG. 14, a group of lenses 8B constituting a coaxial optical system serving as a telecentric lens. As exemplified in FIG. 14, the group of lenses 8B includes first lens 81B formed from a convex meniscus lens, and second lens 82B formed from a convex meniscus lens. Optical axis 803 (optical axis of first lens 81B and second lens 82B) of imaging optical system 323 is a straight line extending in a normal line direction of the display plane (front surface 11). That is, optical axis 803 of imaging optical system 323 is substantially orthogonal to front surface 11 of screen 1.

With imaging optical system 323 configured as described above, as illustrated in FIG. 14, a locus of focal position Pf1 when irradiation unit 3B wholly scans the display plane (front surface 11) is to be formed inclined with respect to reference plane 503 to lie along front surface 11. That is, image plane 504 to be formed with a locus of focal position Pf1 of imaging optical system 323 is a plane along front surface 11 of screen 1.

As exemplified in FIG. 14, image plane 504 is inclined at angle θ with respect to reference plane 503, and is a plane parallel to the display plane, i.e., to front surface 11 of screen 1. In other words, a locus of focal position Pf1 when irradiation unit 3B wholly scans the display plane (front surface 11) is to be formed on image plane 504 parallel to front surface 11.

In a configuration where optical axis 803 of imaging optical system 323 is substantially orthogonal to front surface 11 of screen 1, optical axis 803 of imaging optical system 323 is inclined with respect to movement direction X (see FIG. 12). Therefore, as for projection unit 4 aligning with screen 1 in movement direction X (see FIG. 3), propagation efficiency of light passing through screen 1 may possibly lower. That is, most of light passing through screen 1 along optical axis 803 of imaging optical system 323 does not become incident on projection unit 4, leading to a reduction in amount of light incident on projection unit 4. As a result, insufficient intensity or uneven intensity would be likely to occur in virtual image 300, for example. In display device 10 according to the present exemplary embodiment, screen 1 is applied with a configuration described below to suppress propagation efficiency of light passing through screen 1 with respect to projection unit 4 from lowering.

That is, in the present exemplary embodiment, as illustrated in FIG. 14, screen 1 further includes a plurality of optical elements 91 configured to change a direction of light incident on the display plane (front surface 11) or light emitted from the display plane (front surface 11) to allow the light to be incident on projection unit 4 (see FIG. 3) in movement direction X. Each of the plurality of optical elements 91 is a micro-prism, for example.

Specifically, the plurality of optical elements 91 are formed from a sheet of a micro-prism array where a plurality of micro-prisms each having a triangular prismatic shape are integrally arranged in the longitudinal direction of front surface 11. With the plurality of optical elements 91 (micro-prism array) described above disposed on front surface 11 of screen 1, as illustrated in FIG. 14, for example, light becomes incident on the display plane (front surface 11) in movement direction X. Therefore, most of light passing through screen 1 becomes incident on projection unit 4 in movement direction X. As FIG. 14 schematically illustrates the plurality of optical elements 91, a size relationship between screen 1 and each of optical elements 91 differs from an actual size relationship between screen 1 and each of optical elements 91 in display device 10, for example.

Figure 15A:
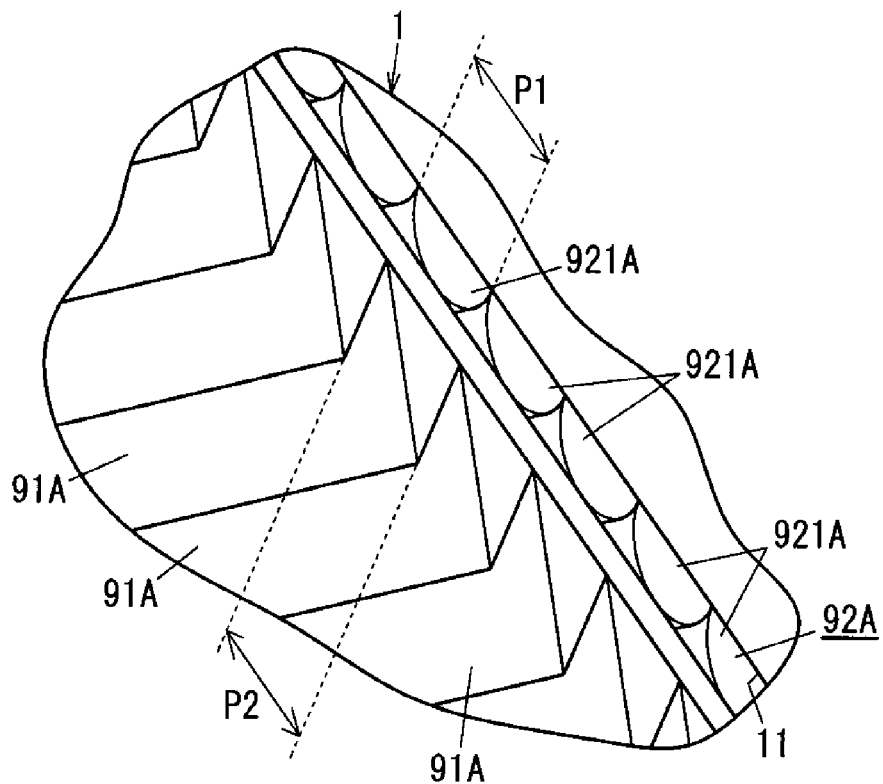
FIG. 15A is a perspective view illustrating an example of a screen in the display device illustrated in FIG. 14.

In the present exemplary embodiment, as illustrated in FIG. 15A, screen 1 further includes lenticular lens 92A including a plurality of micro-lenses 921A. Lenticular lens 92A is formed from a sheet of a lenticular lens where a plurality of cylindrical lenses are integrally arranged in the longitudinal direction of front surface 11, for example. With lenticular lens 92A disposed on front surface 11 of screen 1, as illustrated in FIG. 15A, for example, front surface 11 is provided with light-diffusing property within a plane orthogonal to the lateral direction. The plurality of optical elements 91A are disposed to overlap with lenticular lens 92A, for example.

The plurality of micro-lenses 921A are disposed at first intervals P1 in the longitudinal direction. On the other hand, the plurality of optical elements 91A are disposed at second intervals P2 in the longitudinal direction. When N represents a natural number, each of second intervals P2 is represented by N times of each of first intervals P1 or 1/N times of each of first intervals P1. In short, each of second intervals P2 is N (natural number) times of each of first intervals P1, or each of first intervals P1 is N (natural number) times of each of second intervals P2. As exemplified in FIG. 15A, each of second intervals P2 is identical to each of first intervals P1, that is, each of second intervals P2 is obtained by multiplying first interval P1 by one.

Figure 15B:
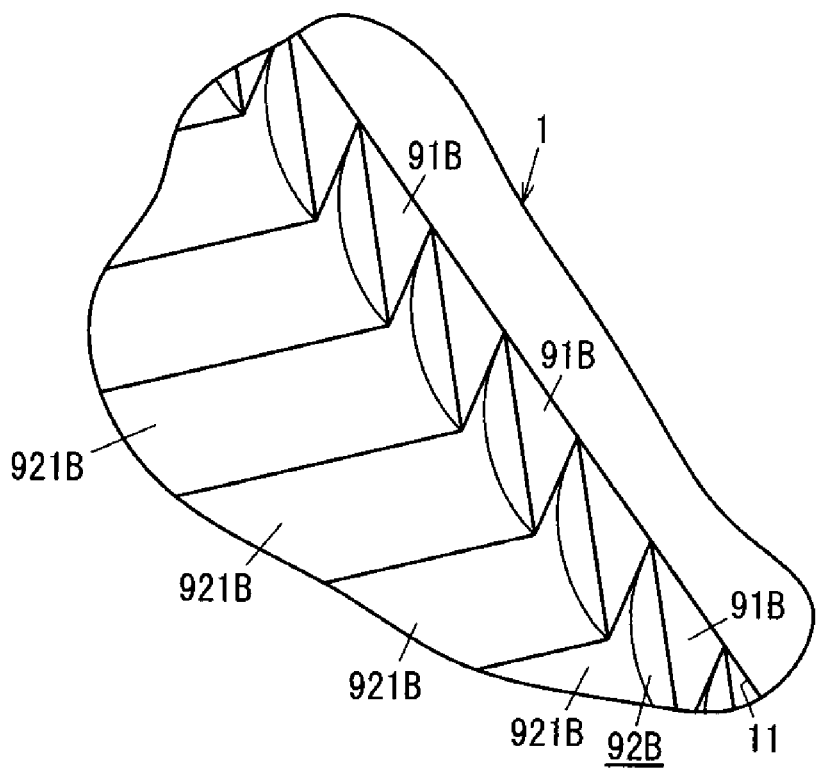
FIG. 15B is a perspective view illustrating another example of the screen in the display device illustrated in FIG. 14.

Furthermore, as illustrated in FIG. 15B, a plurality of optical elements 91B may be integrally formed with lenticular lens 92B. As exemplified in FIG. 15B, each of the plurality of micro-lenses 921B is integrally formed on a slope of each of optical elements 91B.

As described above, in display device 10 according to the present exemplary embodiment, optical axis 803 of imaging optical system 323 is a straight line extending in the normal line direction of the display plane (front surface 11). With display device 10, a locus of focal position Pf1 when irradiation unit 3 wholly scans the display plane (front surface 11) lies along front surface 11 serving as the display plane. Therefore, while a locus of focal position Pf1 of imaging optical system 323 is within a range between the display plane of screen 1 at first position Po1 and the display plane of screen 1 at second position Po2, the moving range of screen 1 can be further narrowed. Therefore, variations in size of a luminescent spot on front surface 11 of screen 1 as screen 1 moves are further suppressed. As a result, in display device 10, resolution of image 700 formed on screen 1 by light from irradiation unit 3 can be increased, advantageously increasing resolution of virtual image 300.

As illustrated in the present exemplary embodiment, screen 1 may preferably further include the plurality of optical elements 91 (91A and 91B) configured to change a direction of light incident on the display plane (front surface 11) or light emitted from the display plane (front surface 11) to allow the light to be incident on projection unit 4 in movement direction X. With the configuration, propagation efficiency of light passing through screen 1 with respect to projection unit 4 can be suppressed from lowering. Therefore, insufficient intensity or uneven intensity in virtual image 300 due to a reduction in amount of light incident on projection unit 4 can be suppressed from occurring. However, the configuration is not an essential configuration for display device 10. The plurality of optical elements 91 (91A and 91B) may be appropriately omitted.

As illustrated in the present exemplary embodiment, screen 1 may preferably further include lenticular lens 92A (or 92B) including the plurality of micro-lenses 921A (or 921B). In this case, the plurality of micro-lenses 921A (or 921B) are disposed at first intervals P1 in the longitudinal direction inclined with respect to reference plane 503 on the display plane (front surface 11). The plurality of optical elements 91 (91A and 91B) are disposed at second intervals P2 in the longitudinal direction. When N represents a natural number, each of second intervals P2 is represented by N times of each of first intervals P1 or 1/N times of each of first intervals P1. With the configuration, insufficient intensity or uneven intensity in virtual image 300 due to interference between the plurality of optical elements 91 (91A and 91B) and lenticular lens 92A (or 92B) can be suppressed from occurring. However, the configuration is not an essential configuration for display device 10. Lenticular lens 92A (or 92B) may be appropriately omitted.

Figure 16:
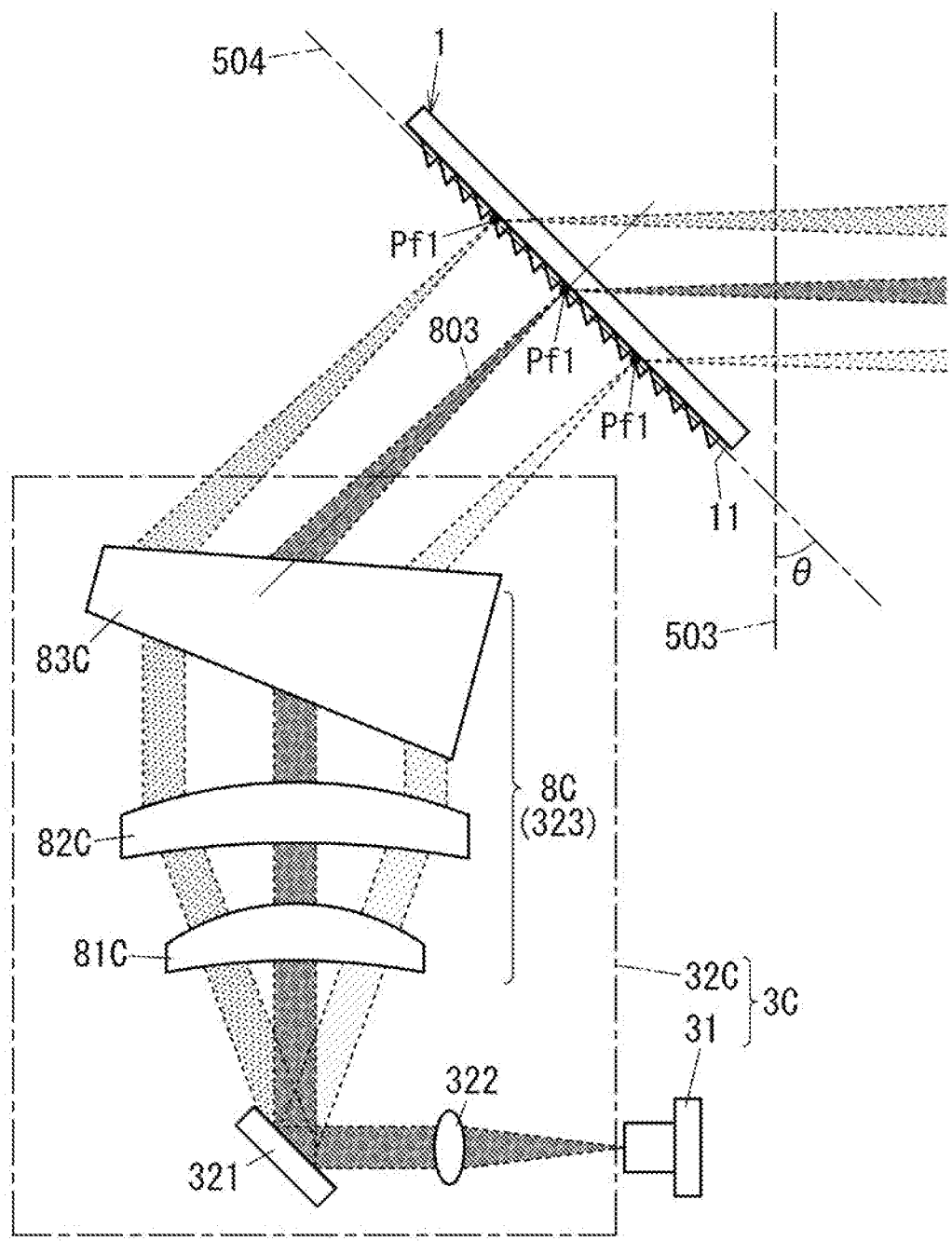
FIG. 16 is a conceptual diagram illustrating a configuration of an irradiation unit in a display device according to a modification to the fourth exemplary embodiment of the present disclosure.

As a modification to the fourth exemplary embodiment, as illustrated in FIG. 16, scanner 32C in irradiation unit 3C may differ in configuration from scanner 32B according to the fourth exemplary embodiment. In the present modification, imaging optical system 323 includes, as illustrated in FIG. 16, a group of lenses 8C constituting a coaxial optical system serving as a telecentric lens. As exemplified in FIG. 16, the group of lenses 8C includes first lens 81C formed from a convex meniscus lens, second lens 82C formed from a convex meniscus lens, and prism 83C. Prism 83C is configured to change a direction of light incident from second lens 82C to allow the direction to align with the normal line direction of display plane (front surface 11). That is, optical axis 803 of imaging optical system 323 (optical axis of prism 83C) is a straight line extending in the normal line direction of display plane (front surface 11). That is, optical axis 803 of imaging optical system 323 is substantially orthogonal to front surface 11 of screen 1.

Each of the intervals (second intervals P2) of the plurality of optical elements 91 (91A and 91B) is not limited to N times or 1/N times of each of the intervals (first intervals P1) of the plurality of micro-lenses 921A (or 921B). Furthermore, the configuration of the plurality of optical elements 91 (91A and 91B) is not limited to a configuration of disposition at equal intervals in the longitudinal direction, but may be a configuration of disposition at uneven intervals in the longitudinal direction.

The configuration of display device 10 according to the fourth exemplary embodiment (including the modifications) can be combined with the configuration of display device 10 according to the second exemplary embodiment (including the modifications) as appropriate.

Fifth Exemplary Embodiment

Display device 10 according to the present exemplary embodiment is different from display device 10 according to the first exemplary embodiment in control contents of drive unit 2 for moving screen 1. Hereinafter, constituent elements identical to those of the first exemplary embodiment are denoted by like reference signs and explanations thereof will be omitted.

In the present exemplary embodiment, controller 5 controls drive unit 2 so as to reduce rapid acceleration and deceleration of screen 1 in movement direction X. Specifically, controller 5 defines a control pattern of drive unit 2 so as to reduce acceleration imposed on screen 1 to be less than or equal to a prescribed value, upon switching between a state with screen 1 being stopped and a state with screen 1 being moved, and upon switching the direction toward which screen 1 moves.

Figure 17:
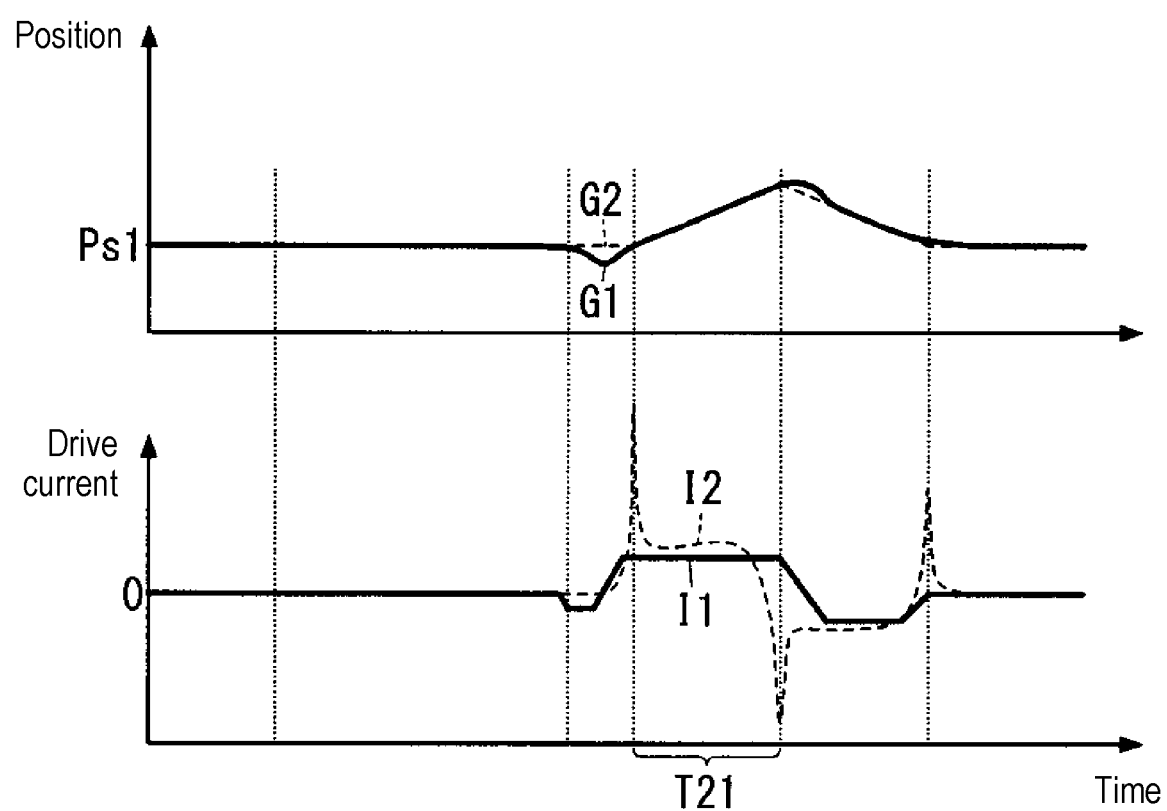
FIG. 17 is a graph illustrating temporal changes of a position of a screen in a display device according to a fifth exemplary embodiment of the present disclosure, and a drive current.

FIG. 17 is a graph illustrating temporal changes of a position of screen 1 in movement direction X, and a drive current of drive unit 2 (equivalent to consuming power) during period T21 (see FIG. 10A) for drawing second image 702 and periods before and after period T21. In FIG. 17, a horizontal axis is a time axis, an upper stage indicates the position of screen 1, and a lower stage indicates the drive current.

In the configuration of the first exemplary embodiment, as illustrated with "G2" (broken line) in FIG. 17, screen 1 staying still at reference position Ps1 suddenly starts moving at a prescribed speed from a start point of period T21, and further a movement direction of screen 1 is suddenly switched at an end point of period T21. In addition, when screen 1 returns to reference position Ps1, screen 1 is suddenly stopped. Therefore, in the drive current flowing through drive unit 2, as illustrated with "I2" (broken line) in FIG. 17, pulse-like high-frequency components are generated at the start point and the end point of period T21 and timing when screen 1 is stopped, in some cases.

In contrast, in a configuration of the present exemplary embodiment, as illustrated with "G1" (solid line) in FIG. 17, by utilizing the periods before and after period T21, rapid acceleration and deceleration of screen 1 are reduced such that the moving speed of screen 1 changes continuously. In other words, controller 5 controls drive unit 2 through the periods before and after period T21 such that the drive current flowing through drive unit 2 has a smooth waveform as illustrated with "I1" (solid line) in FIG. 17. This can reduce the acceleration imposed on screen 1 to be less than or equal to the prescribed value, while maintaining the moving speed of screen 1 during period T21 at a prescribed speed. In addition, also when screen 1 returns to reference position Ps1, sudden stop of screen 1 can be avoided by gradually decelerating screen 1.

As described above, display device 10 according to the present exemplary embodiment can reduce the acceleration imposed on screen 1 to be less than or equal to the prescribed value, and as a result, generation of the pulse-like high-frequency components can be reduced in the drive current of drive unit 2. This can provide advantages in which impact imposed on screen 1 and drive unit 2 is lessened, and generation of noise due to the high-frequency components can be reduced.

The control contents of drive unit 2 described in the fifth exemplary embodiment is merely an example. For example, controller 5 may control drive unit 2 so as to change the position of screen 1 in movement direction X in a sine wave shape along time series.

The configuration of display device 10 according to the fifth exemplary embodiment (including the modifications) can be appropriately combined with the configurations of the first exemplary embodiment (including the modifications), the second exemplary embodiment (including the modifications), the third exemplary embodiment (including the modifications), and the fourth exemplary embodiment (including the modifications).

The drawings illustrated in each exemplary embodiment described above are merely conceptual diagrams of display device 10, and are different in shapes, sizes, and positional relationships from actual display device 10 as appropriate.

As described above, the display device according to any one of the exemplary embodiments of the present disclosure includes the screen, the drive unit, the irradiation unit, and the projection unit. The screen has the display plane inclined with respect to the reference plane. The drive unit is configured to move the screen between the first position and the second position in the movement direction orthogonal to the reference plane. The irradiation unit includes the imaging optical system, and is configured to cause the imaging optical system to irradiate the screen with light to scan the display plane of the screen to form an image on the display plane. The light passing through the screen and output from the screen in the movement direction described above is incident on the projection unit as incident light. The projection unit is configured to use the incident light to form a virtual image corresponding to the image described above in a target space. A locus of the focal position of the imaging optical system when the irradiation unit wholly scans the display plane is within a range between the display plane of the screen at the first position and the display plane of the screen at the second position.

The imaging optical system may include an eccentric optical system. In this case, the eccentric optical system is configured to cause a locus of a focal position when the irradiation unit wholly scans the display plane to be formed inclined with respect to the reference plane along the display plane.

The imaging optical system may include a focusing lens and a lens drive unit. The focusing lens is configured to move the focal position in the movement direction described above. The lens drive unit is configured to drive the focusing lens in synchronization with scanning by the irradiation unit to allow the locus of the focal position when the irradiation unit wholly scans the display plane to lie along the display plane.

The optical axis of the imaging optical system may be a straight line extending in the normal line direction of the display plane.

In the configuration, the screen may further include a plurality of optical elements configured to change a direction of light incident on the display plane or light emitted from the display plane to allow the incident light on the projection unit to extend in the movement direction described above.

In a case where the screen includes the plurality of optical elements, the screen may further include a lenticular lens including a plurality of micro-lenses. The plurality of micro-lenses are disposed on the display plane at first intervals in the longitudinal direction inclined with respect to the reference plane. On the other hand, the plurality of optical elements are disposed at second intervals in the longitudinal direction. When N represents a natural number, each of the second intervals is represented by N times of each of the first intervals or 1/N times of each of the first intervals.

In the configuration described above, a locus of the focal position when the irradiation unit wholly scans the display plane may be formed on an image plane parallel to the display plane.

In this case, the image plane may lie at an equal distance from both of the display plane of the screen at the first position and the display plane of the screen at the second position.

In the configuration described above, a controller configured to control the drive unit and the irradiation unit may be further provided. When forming a first virtual image serving as the virtual image on a first virtual plane whose inclination angle with respect to an optical axis of the projection unit is smaller than a predetermined value, the controller is configured to hold the screen in the movement direction described above. When forming a second virtual image serving as the virtual image on a second virtual plane whose inclination angle with respect to the optical axis of the projection unit is larger than the predetermined value described above, the controller is configured to move the screen in the movement direction described above.

The moving body according to any one of the exemplary embodiments of the present disclosure includes the main body, the drive unit, the display device described above, and the reflective member. The drive unit is configured to move the main body. The main body carries the display device and the reflective member. The reflective member is configured to reflect light from the projection unit of the display device.

INDUSTRIAL APPLICABILITY

The display device according to the present disclosure is advantageous as a device configured to provide information to a driver in a moving body typically represented by a vehicle, for example.

REFERENCE MARKS IN THE DRAWINGS

1: screen
2: drive unit
3, 3A, 3B, 3C: irradiation unit
4: projection unit
5: controller
8: eccentric optical system
8A: group of focusing lenses
8B, 8C: group of lenses
10: display device
11: front surface (display plane)
12: rear surface
31: light source
32, 32A, 32B, 32C: scanner
41: magnifying lens
42: first mirror
43: second mirror
81, 81A, 81B, 81C: first lens 82, 82A, 82B, 82C: second lens
83, 83A: third lens
83C: prism
84A: lens drive unit
91, 91A, 91B: optical element
92A, 92B: lenticular lens
921A, 921B: micro-lens
100: vehicle (moving body)
101: windshield (reflective member)
102: dashboard
111: first end part
112: second end part
150: main body
152: drive unit
154: drive source
156: drive wheel
200: user
300: virtual image
301: first virtual image
302: second virtual image
321: mirror unit
322: lens
323: imaging optical system
400: target space
500: optical axis
501: first virtual plane
502: second virtual plane
503: reference plane
504: image plane
600: road surface
700: image
701: first image
702: second image
801, 802, 803: optical axis
P1: first interval
P2: second interval
Pf1: focal position
Po1: first position
Po2: second position

The invention claimed is:

1. A display device comprising:
a screen having a display plane inclined with respect to a reference plane;
a drive unit that moves the screen between a first position and a second position in a movement direction orthogonal to the reference plane;
an irradiator including an imaging optical system, the irradiator being configured to cause the imaging optical system to irradiate the screen with light to scan the display plane of the screen to form an image on the display plane; and
a projector that receives, as incident light, light passing through the screen and outputted from the screen in the movement direction, the projector configured to irradiate a reflective member with the incident light to allow the reflective member to reflect the incident light, and the projector configured to form a virtual image corresponding to the image in a target space facing in a direction opposite to a reflection direction of the incident light,
wherein a locus of a focal position of the imaging optical system when the irradiator wholly scans the display plane is within a range between the display plane of the screen at the first position and the display plane of the screen at the second position.

2. The display device according to claim 1, wherein
the imaging optical system includes an eccentric optical system, and
the eccentric optical system causes the locus of the focal position when the irradiator wholly scans the display plane to incline with respect to the reference plane to allow the locus to lie along the display plane.

3. The display device according to claim 1, wherein the imaging optical system includes
a focusing lens that moves the focal position in the movement direction, and
a lens drive unit that drives the focusing lens in synchronization with scanning by the irradiator to allow the locus of the focal position when the irradiator wholly scans the display plane to lie along the display plane.

4. The display device according to claim 1, wherein an optical axis of the imaging optical system is a straight line extending in a normal line direction of the display plane.

5. The display device according to claim 4, wherein the screen further includes a plurality of optical elements configured to change a direction of light incident on the display plane or light emitted from the display plane to allow the incident light on the projector to extend in the movement direction.

6. The display device according to claim 5, wherein
the screen further includes a lenticular lens including a plurality of micro-lenses,
the plurality of micro-lenses are disposed on the display plane at first intervals in a longitudinal direction inclined with respect to the reference plane,
the plurality of optical elements are disposed at second intervals in the longitudinal direction,
each of the second intervals is represented by N times of each of the first intervals or 1/N times of each of the first intervals, and
N represents a natural number.

7. The display device according to claim 1, wherein the locus of the focal position when the irradiator wholly scans the display plane lies on an image plane parallel to the display plane.

8. The display device according to claim 7, wherein the image plane lies at an equal distance from both of the display plane of the screen at the first position and the display plane of the screen at the second position.

9. The display device according to claim 1, further comprising a controller configured to control the drive unit and the irradiation unit,
wherein the controller:
holds the screen in the movement direction when a first virtual image serving as the virtual image is formed on a first virtual plane whose inclination angle with respect to an optical axis of the projector is smaller than a predetermined value, and
moves the screen in the movement direction when a second virtual image serving as the virtual image is formed on a second virtual plane whose inclination angle with respect to the optical axis of the projector is larger than the predetermined value.

10. A moving body comprising:
a main body;
a drive unit that moves the main body;
the display device according to claim 1, the display device being mounted on the main body; and
the reflective member, which reflects light from the projector of the display device, the reflective member being held to the main body.

* * * * *